(12) United States Patent
Petite et al.

(10) Patent No.: US 7,079,810 B2
(45) Date of Patent: *Jul. 18, 2006

(54) SYSTEM AND METHOD FOR COMMUNICATING WITH A REMOTE COMMUNICATION UNIT VIA THE PUBLIC SWITCHED TELEPHONE NETWORK (PSTN)

(75) Inventors: Thomas D. Petite, Douglasville, GA (US); James Davis, Woodstock, GA (US)

(73) Assignee: StatSignal IPC, LLC, Atlanta, GA (US)

( * ) Notice: Subject to any disclaimer, the term of this patent is extended or adjusted under 35 U.S.C. 154(b) by 327 days.

This patent is subject to a terminal disclaimer.

(21) Appl. No.: 10/657,398

(22) Filed: Sep. 8, 2003

(65) Prior Publication Data

US 2004/0053639 A1 Mar. 18, 2004

Related U.S. Application Data

(63) Continuation-in-part of application No. 09/301,671, filed on Apr. 28, 1999, now Pat. No. 6,618,578, which is a continuation-in-part of application No. 08/895,720, filed on Jul. 17, 1997, now Pat. No. 5,926,531, which is a continuation-in-part of application No. 08/825,576, filed on Mar. 31, 1997.

(60) Provisional application No. 60/040,316, filed on Feb. 14, 1997.

(51) Int. Cl.
*H04B 7/00* (2006.01)
(52) U.S. Cl. ............... 455/41.2; 455/39; 455/92
(58) Field of Classification Search ............ 455/39, 455/92, 422.1, 445, 450, 410, 411, 41.2, 464, 455/555, 88, 557, 554.1, 556.1; 379/56.1, 379/56.2, 56.3
See application file for complete search history.

(56) References Cited

U.S. PATENT DOCUMENTS

| | | |
|---|---|---|
| 3,665,475 A | 5/1972 | Gram |
| 3,705,385 A | 12/1972 | Batz |
| 3,723,876 A | 3/1973 | Seaborn, Jr. |

(Continued)

FOREIGN PATENT DOCUMENTS

EP 0718954 6/1996

(Continued)

OTHER PUBLICATIONS

Sutherland, Ed, *Payphones: The Next Hotspot Wave?*, Jan. 28, 2003, http://www.isp-planet.com/fixed_wireless/news/2003/bellcanada_030128.html (3 pages).

(Continued)

*Primary Examiner*—Sonny Trinh
(74) *Attorney, Agent, or Firm*—Troutman Sanders LLP; Ryan A. Schneider, Esq.; James H. Yancey, Jr., Esq.

(57) ABSTRACT

The present invention is generally directed to a system and method for communicating between a personal data access device and a remote communication unit. In accordance with one aspect of the invention, a device, electrically connected for communication with a public switched telephone network (PSTN), is provided for facilitating communications between a personal data access device and a remote communication unit disposed in communication with the PSTN. The device includes a radio frequency (RF) transceiver configured for communication with a remote RF transceiver associated with the personal data access device, via an RF link, and a controller, responsive to communications received from the remote RF transceiver to maintain two-way communication between the personal data access device and the remote communication unit via the PSTN and the RF link.

21 Claims, 11 Drawing Sheets

U.S. PATENT DOCUMENTS

| | | |
|---|---|---|
| 3,742,142 A | 6/1973 | Martin |
| 3,848,231 A | 11/1974 | Wooten |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadwhani et al. |
| 4,025,315 A | 5/1977 | Mazelli |
| 4,056,684 A | 11/1977 | Lindstrom |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,354,181 A | 10/1982 | Spletzer |
| 4,396,910 A | 8/1983 | Enemark et al. |
| 4,396,915 A | 8/1983 | Farnsworth et al. |
| 4,417,450 A | 11/1983 | Morgan, Jr. et al. |
| 4,436,957 A | 3/1984 | Mazza |
| 4,446,454 A | 5/1984 | Pyle |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,670,739 A | 6/1987 | Kelly, Jr. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,800,543 A | 1/1989 | Lyndon-James et al. |
| 4,825,457 A | 4/1989 | Lebowitz |
| 4,829,561 A * | 5/1989 | Matheny ................ 379/144.05 |
| 4,849,815 A | 7/1989 | Streck |
| 4,851,654 A | 7/1989 | Nitta |
| 4,856,046 A * | 8/1989 | Streck et al. ............... 379/56.3 |
| 4,857,912 A | 8/1989 | Everett, Jr. et al. |
| 4,875,231 A | 10/1989 | Hara et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,918,690 A | 4/1990 | Markkula, Jr. et al. |
| 4,918,995 A | 4/1990 | Pearman et al. |
| 4,928,299 A | 5/1990 | Tansky et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,989,230 A | 1/1991 | Gillig et al. |
| 4,991,008 A | 2/1991 | Nama |
| 4,998,095 A | 3/1991 | Shields |
| 4,999,607 A | 3/1991 | Evans |
| 5,032,833 A | 7/1991 | Laporte |
| 5,038,372 A | 8/1991 | Elms et al. |
| 5,055,851 A | 10/1991 | Sheffer |
| 5,057,814 A | 10/1991 | Onan et al. |
| 5,061,997 A | 10/1991 | Rea et al. |
| 5,086,391 A | 2/1992 | Chambers |
| 5,091,713 A | 2/1992 | Horne et al. |
| 5,111,199 A | 5/1992 | Tomoda et al. |
| 5,113,183 A | 5/1992 | Mizuno et al. |
| 5,113,184 A | 5/1992 | Katayama |
| 5,115,224 A | 5/1992 | Kostusiak et al. |
| 5,115,433 A | 5/1992 | Baran et al. |
| 5,124,624 A | 6/1992 | de Vries et al. |
| 5,128,855 A | 7/1992 | Hilber et al. |
| 5,130,519 A | 7/1992 | Bush et al. |
| 5,131,038 A | 7/1992 | Puhl et al. |
| 5,134,650 A | 7/1992 | Blackmon |
| 5,136,285 A | 8/1992 | Okuyama |
| 5,155,481 A | 10/1992 | Brennan, Jr. et al. |
| 5,159,317 A | 10/1992 | Brav |
| 5,162,776 A | 11/1992 | Bushnell et al. |
| 5,177,342 A | 1/1993 | Adams |
| 5,189,287 A | 2/1993 | Parienti |
| 5,191,192 A | 3/1993 | Takahira et al. |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines |
| 5,204,670 A | 4/1993 | Stinton |
| 5,212,645 A | 5/1993 | Wildes et al. |
| 5,216,502 A | 6/1993 | Katz |
| 5,221,838 A | 6/1993 | Gutman et al. |
| 5,223,844 A | 6/1993 | Mansell et al. |
| 5,231,658 A | 7/1993 | Eftechiou |
| 5,235,630 A | 8/1993 | Moody et al. |
| 5,239,575 A | 8/1993 | White et al. |
| 5,241,410 A * | 8/1993 | Streck et al. ................ 398/115 |
| 5,243,338 A | 9/1993 | Brennan, Jr. et al. |
| 5,245,633 A | 9/1993 | Schwartz et al. |
| 5,252,967 A | 10/1993 | Brennan et al. |
| 5,253,167 A | 10/1993 | Yoshida et al. |
| 5,265,150 A | 11/1993 | Heimkamp et al. |
| 5,265,162 A | 11/1993 | Bush et al. |
| 5,266,782 A | 11/1993 | Alanara et al. |
| 5,272,747 A | 12/1993 | Meads |
| 5,282,204 A | 1/1994 | Shpancer et al. |
| 5,282,250 A | 1/1994 | Dent et al. |
| 5,289,165 A | 2/1994 | Belin |
| 5,295,154 A | 3/1994 | Meier et al. |
| 5,305,370 A | 4/1994 | Kearns et al. |
| 5,315,645 A * | 5/1994 | Matheny ................ 379/144.01 |
| 5,317,309 A | 5/1994 | Vercellotti et al. |
| 5,319,364 A | 6/1994 | Waraksa et al. |
| 5,319,698 A | 6/1994 | Glidwell et al. |
| 5,319,711 A | 6/1994 | Servi |
| 5,323,384 A | 6/1994 | Norwood et al. |
| 5,325,429 A | 6/1994 | Kurgan |
| 5,331,318 A | 7/1994 | Montgomery |
| 5,334,974 A | 8/1994 | Simms et al. |
| 5,343,493 A | 8/1994 | Karimullah |
| 5,345,231 A | 9/1994 | Koo et al. |
| 5,347,263 A | 9/1994 | Carroll et al. |
| 5,354,974 A | 10/1994 | Eisenberg |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |
| 5,406,619 A | 4/1995 | Akhteruzzman et al. |
| 5,412,192 A | 5/1995 | Hoss |
| 5,412,760 A | 5/1995 | Peitz |
| 5,416,475 A | 5/1995 | Tolbert et al. |
| 5,416,725 A | 5/1995 | Pacheco et al. |
| 5,418,812 A | 5/1995 | Reyes et al. ................... 375/1 |
| 5,424,708 A | 6/1995 | Ballestry et al. |
| 5,432,507 A | 7/1995 | Mussino et al. |

| | | | | | |
|---|---|---|---|---|---|
| 5,438,329 A | 8/1995 | Gastouniotis et al. | 5,682,139 A | 10/1997 | Pradeep et al. |
| 5,439,414 A | 8/1995 | Jacob | 5,682,476 A | 10/1997 | Tapperson et al. |
| 5,442,553 A | 8/1995 | Parrillo | 5,689,229 A | 11/1997 | Chaco et al. |
| 5,445,287 A | 8/1995 | Center et al. | 5,699,328 A | 12/1997 | Ishizaki et al. |
| 5,451,929 A | 9/1995 | Adelman et al. | 5,701,002 A | 12/1997 | Oishi et al. |
| 5,451,938 A | 9/1995 | Brennan, Jr. | 5,704,046 A | 12/1997 | Hogan |
| 5,452,344 A | 9/1995 | Larson | 5,704,517 A | 1/1998 | Lancaster, Jr. |
| 5,465,401 A | 11/1995 | Thompson | 5,706,191 A | 1/1998 | Bassett et al. |
| 5,467,074 A | 11/1995 | Pedtke | 5,706,976 A | 1/1998 | Purkey |
| 5,467,082 A | 11/1995 | Sanderson | 5,708,223 A | 1/1998 | Wyss |
| 5,467,345 A | 11/1995 | Cutler et al. | 5,708,655 A | 1/1998 | Toth |
| 5,468,948 A | 11/1995 | Koenck et al. | 5,712,619 A | 1/1998 | Simkin |
| 5,471,201 A | 11/1995 | Cerami et al. | 5,712,980 A | 1/1998 | Beeler et al. |
| 5,473,322 A | 12/1995 | Carney | 5,714,931 A | 2/1998 | Petite et al. |
| 5,475,689 A | 12/1995 | Kay et al. | 5,717,718 A | 2/1998 | Roswell et al. |
| 5,481,259 A | 1/1996 | Bane | 5,726,634 A | 3/1998 | Hess et al. |
| 5,484,997 A | 1/1996 | Haynes | 5,726,984 A | 3/1998 | Kubler et al. |
| 5,493,273 A | 2/1996 | Smurlo et al. | 5,732,074 A | 3/1998 | Spaur et al. |
| 5,493,287 A | 2/1996 | Bane | 5,732,078 A | 3/1998 | Arango |
| 5,506,837 A | 4/1996 | Sollner et al. | 5,736,965 A | 4/1998 | Mosebrook et al. |
| 5,509,073 A | 4/1996 | Monnin | 5,740,232 A | 4/1998 | Pailles et al. |
| 5,513,244 A | 4/1996 | Joao et al. | 5,742,509 A | 4/1998 | Goldberg et al. |
| 5,515,419 A | 5/1996 | Sheffer | 5,745,849 A | 4/1998 | Britton |
| 5,517,188 A | 5/1996 | Caroll et al. | 5,748,104 A | 5/1998 | Argyroudis et al. |
| 5,522,089 A | 5/1996 | Kikinis et al. | 5,748,619 A | 5/1998 | Meier |
| 5,528,215 A | 6/1996 | Siu et al. | 5,754,111 A | 5/1998 | Garcia |
| 5,539,825 A | 7/1996 | Akiyama et al. | 5,754,227 A | 5/1998 | Fukuoka |
| 5,541,938 A | 7/1996 | Di Zenzo et al. | 5,757,783 A | 5/1998 | Eng et al. |
| 5,542,100 A | 7/1996 | Hatakeyama | 5,757,788 A | 5/1998 | Tatsumi et al. |
| 5,544,036 A | 8/1996 | Brown, Jr. et al. | 5,761,083 A | 6/1998 | Brown, Jr. et al. |
| 5,544,784 A | 8/1996 | Malaspina | 5,764,742 A | 6/1998 | Howard et al. |
| 5,548,632 A | 8/1996 | Walsh et al. | 5,771,274 A | 6/1998 | Harris |
| 5,550,358 A | 8/1996 | Tait et al. | 5,774,052 A | 6/1998 | Hamm et al. |
| 5,550,359 A | 8/1996 | Bennett | 5,781,143 A | 7/1998 | Rossin |
| 5,550,535 A | 8/1996 | Park | 5,790,644 A * | 8/1998 | Kikinis ................. 379/114.19 |
| 5,553,094 A | 9/1996 | Johnson et al. | 5,790,662 A | 8/1998 | Valerij et al. |
| 5,555,258 A | 9/1996 | Snelling et al. | 5,790,938 A | 8/1998 | Talarmo |
| 5,555,286 A | 9/1996 | Tendler | 5,796,727 A | 8/1998 | Harrison et al. |
| 5,562,537 A | 10/1996 | Zver et al. | 5,798,964 A | 8/1998 | Shimizu et al. |
| 5,565,857 A | 10/1996 | Lee | 5,801,643 A | 9/1998 | Williams et al. |
| 5,572,438 A | 11/1996 | Ehlers et al. | 5,815,505 A * | 9/1998 | Mills .......................... 370/522 |
| 5,573,181 A | 11/1996 | Ahmed | 5,818,822 A | 10/1998 | Thomas et al. |
| 5,574,111 A | 11/1996 | Brichta et al. | 5,822,273 A | 10/1998 | Bary et al. |
| 5,583,850 A | 12/1996 | Snodgrass et al. | 5,822,544 A | 10/1998 | Chaco et al. |
| 5,587,705 A | 12/1996 | Morris | 5,826,195 A | 10/1998 | Westerlage et al. |
| 5,589,878 A | 12/1996 | Cortjens et al. | 5,828,044 A | 10/1998 | Jun et al. |
| 5,590,038 A | 12/1996 | Pitroda | 5,832,057 A | 11/1998 | Furman |
| 5,590,179 A | 12/1996 | Shincovich et al. | 5,838,223 A | 11/1998 | Gallant et al. |
| 5,592,491 A | 1/1997 | Dinks | 5,838,237 A | 11/1998 | Revell et al. |
| 5,594,431 A | 1/1997 | Sheppard et al. | 5,838,812 A | 11/1998 | Pare, Jr. et al. |
| 5,602,843 A | 2/1997 | Gray | 5,841,118 A | 11/1998 | East et al. |
| 5,604,414 A | 2/1997 | Milligan et al. | 5,841,764 A | 11/1998 | Roderique et al. |
| 5,604,869 A | 2/1997 | Mincher et al. | 5,842,976 A | 12/1998 | Williamson |
| 5,606,361 A | 2/1997 | Davidsohn et al. | 5,844,808 A | 12/1998 | Konsmo et al. |
| 5,608,786 A | 3/1997 | Gordon | 5,845,230 A | 12/1998 | Lamberson |
| 5,613,620 A | 3/1997 | Center et al. | 5,852,658 A | 12/1998 | Knight et al. |
| 5,615,277 A | 3/1997 | Hoffman | 5,854,994 A | 12/1998 | Canada et al. |
| 5,619,192 A | 4/1997 | Ayala | 5,862,201 A | 1/1999 | Sands |
| 5,625,410 A | 4/1997 | Washino et al. | 5,864,772 A | 1/1999 | Alvarado et al. |
| 5,628,050 A | 5/1997 | McGraw et al. | 5,873,043 A | 2/1999 | Comer |
| 5,629,687 A | 5/1997 | Sutton et al. | 5,874,903 A | 2/1999 | Shuey et al. |
| 5,629,875 A | 5/1997 | Adair, Jr. | 5,880,677 A | 3/1999 | Lestician |
| 5,630,209 A | 5/1997 | Wizgall et al. | 5,884,184 A | 3/1999 | Sheffer |
| 5,631,554 A | 5/1997 | Briese et al. | 5,884,271 A | 3/1999 | Pitroda |
| 5,644,294 A | 7/1997 | Ness | 5,886,333 A | 3/1999 | Miyake |
| 5,655,219 A | 8/1997 | Jusa et al. | 5,889,468 A | 3/1999 | Banga |
| 5,657,389 A | 8/1997 | Houvener | 5,892,690 A | 4/1999 | Boatman et al. |
| 5,659,300 A | 8/1997 | Dresselhuys et al. | 5,892,758 A | 4/1999 | Argyroudis |
| 5,659,303 A | 8/1997 | Adair, Jr. | 5,892,924 A | 4/1999 | Lyon et al. |
| 5,668,876 A | 9/1997 | Falk et al. | 5,896,097 A | 4/1999 | Cardozo |
| 5,673,252 A | 9/1997 | Johnson et al. | 5,897,607 A | 4/1999 | Jenney et al. |
| 5,673,304 A | 9/1997 | Connor et al. | 5,898,369 A | 4/1999 | Godwin |
| 5,673,305 A | 9/1997 | Ross | 5,905,438 A | 5/1999 | Weiss et al. |

| Patent | Date | Inventor |
|---|---|---|
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,914,672 A | 6/1999 | Glorioso et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,941,363 A | 8/1999 | Partyka et al. |
| 5,948,040 A | 9/1999 | DeLorme et al. |
| 5,949,779 A | 9/1999 | Mostafa et al. |
| 5,949,799 A | 9/1999 | Grivna et al. |
| 5,953,371 A | 9/1999 | Roswell et al. |
| 5,955,718 A | 9/1999 | Levasseur et al. |
| 5,960,074 A | 9/1999 | Clark |
| 5,963,146 A | 10/1999 | Johnson et al. |
| 5,963,452 A | 10/1999 | Etoh et al. |
| 5,963,650 A | 10/1999 | Simionescu et al. |
| 5,969,608 A | 10/1999 | Sojdehei et al. |
| 5,973,756 A | 10/1999 | Erlin |
| 5,978,364 A | 11/1999 | Melnik |
| 5,978,371 A | 11/1999 | Mason, Jr. et al. |
| 5,986,574 A | 11/1999 | Colton |
| 5,987,421 A | 11/1999 | Chuang |
| 5,991,639 A | 11/1999 | Rautiola et al. |
| 5,994,892 A | 11/1999 | Turino et al. |
| 5,995,592 A * | 11/1999 | Shirai et al. ............... 379/56.3 |
| 5,995,593 A * | 11/1999 | Cho ............... 379/56.3 |
| 5,997,170 A | 12/1999 | Brodbeck |
| 5,999,094 A | 12/1999 | Nilssen |
| 6,005,759 A | 12/1999 | Hart et al. |
| 6,005,963 A | 12/1999 | Bolle et al. |
| 6,021,664 A | 2/2000 | Granato et al. |
| 6,023,223 A | 2/2000 | Baxter, Jr. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,266 A | 3/2000 | Williams et al. |
| 6,036,086 A | 3/2000 | Sizer, II et al. |
| 6,038,491 A | 3/2000 | McGarry et al. |
| 6,044,062 A | 3/2000 | Brownrigg et al. |
| 6,054,920 A | 4/2000 | Smith et al. |
| 6,060,994 A | 5/2000 | Chen |
| 6,061,604 A | 5/2000 | Russ et al. |
| 6,064,318 A | 5/2000 | Kirchner, III et al. |
| 6,067,030 A | 5/2000 | Burnett et al. |
| 6,069,886 A | 5/2000 | Ayerst et al. |
| 6,073,169 A | 6/2000 | Shuey et al. |
| 6,073,266 A | 6/2000 | Ahmed et al. |
| 6,073,840 A | 6/2000 | Marion |
| 6,075,451 A | 6/2000 | Lebowitz et al. |
| 6,087,957 A | 7/2000 | Gray |
| 6,088,659 A | 7/2000 | Kelley et al. |
| 6,094,622 A | 7/2000 | Hubbard et al. |
| 6,100,817 A | 8/2000 | Mason, Jr. et al. |
| 6,101,427 A | 8/2000 | Yang |
| 6,101,445 A | 8/2000 | Alvarado et al. |
| 6,112,983 A | 9/2000 | D'Anniballe et al. |
| 6,119,076 A | 9/2000 | Williams et al. |
| 6,121,593 A | 9/2000 | Mansbery et al. |
| 6,121,885 A | 9/2000 | Masone et al. |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,133,850 A | 10/2000 | Moore |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,163,276 A | 12/2000 | Irving et al. |
| 6,172,616 B1 | 1/2001 | Johnson et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,181,255 B1 | 1/2001 | Crimmins et al. |
| 6,181,284 B1 | 1/2001 | Madsen et al. |
| 6,181,981 B1 | 1/2001 | Varga et al. |
| 6,188,354 B1 | 2/2001 | Soliman et al. |
| 6,192,390 B1 | 2/2001 | Berger et al. |
| 6,198,390 B1 | 3/2001 | Schlager et al. |
| 6,199,068 B1 | 3/2001 | Carpenter |
| 6,208,266 B1 | 3/2001 | Lyons et al. |
| 6,215,404 B1 | 4/2001 | Morales |
| 6,218,953 B1 | 4/2001 | Petite |
| 6,218,983 B1 | 4/2001 | Kerry et al. |
| 6,219,409 B1 | 4/2001 | Smith et al. |
| 6,229,439 B1 | 5/2001 | Tice |
| 6,233,327 B1 | 5/2001 | Petite |
| 6,234,111 B1 | 5/2001 | Ulman et al. |
| 6,236,332 B1 | 5/2001 | Conkright et al. |
| 6,243,010 B1 | 6/2001 | Addy et al. |
| 6,246,677 B1 | 6/2001 | Nap et al. |
| 6,249,516 B1 | 6/2001 | Brownrigg et al. |
| 6,259,369 B1 | 7/2001 | Monico |
| 6,286,756 B1 | 9/2001 | Stinson et al. |
| 6,288,634 B1 | 9/2001 | Weiss et al. |
| 6,288,641 B1 | 9/2001 | Carsais |
| 6,295,291 B1 | 9/2001 | Larkins |
| 6,301,514 B1 | 10/2001 | Canada et al. |
| 6,305,602 B1 | 10/2001 | Grabowski et al. |
| 6,308,111 B1 | 10/2001 | Koga |
| 6,311,167 B1 | 10/2001 | Davis et al. |
| 6,314,169 B1 | 11/2001 | Schelberg, Jr. et al. |
| 6,317,029 B1 | 11/2001 | Fleeter |
| 6,334,117 B1 | 12/2001 | Covert et al. |
| 6,351,223 B1 | 2/2002 | DeWeerd et al. |
| 6,356,205 B1 | 3/2002 | Salvo et al. |
| 6,357,034 B1 | 3/2002 | Muller et al. |
| 6,362,745 B1 | 3/2002 | Davis |
| 6,363,057 B1 | 3/2002 | Ardalan et al. |
| 6,366,217 B1 | 4/2002 | Cunningham et al. |
| 6,369,769 B1 | 4/2002 | Nap et al. |
| 6,370,489 B1 | 4/2002 | Williams et al. |
| 6,373,399 B1 | 4/2002 | Johnson et al. |
| 6,380,851 B1 | 4/2002 | Gilbert et al. |
| 6,384,722 B1 | 5/2002 | Williams |
| 6,393,341 B1 | 5/2002 | Lawrence et al. |
| 6,393,381 B1 | 5/2002 | Williams et al. |
| 6,393,382 B1 | 5/2002 | Williams et al. |
| 6,396,839 B1 | 5/2002 | Ardalan et al. |
| 6,400,819 B1 | 6/2002 | Nakano et al. |
| 6,401,081 B1 | 6/2002 | Montgomery et al. |
| 6,411,889 B1 | 6/2002 | Mizunuma et al. |
| 6,415,245 B1 | 7/2002 | Williams et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 | 8/2002 | Petite |
| 6,431,439 B1 | 8/2002 | Suer et al. |
| 6,437,692 B1 | 8/2002 | Petite et al. |
| 6,438,575 B1 | 8/2002 | Khan et al. |
| 6,445,291 B1 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |

| | | |
|---|---|---|
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,504,357 B1 | 1/2003 | Hemminger et al. |
| 6,507,794 B1 | 1/2003 | Hubbard et al. |
| 6,509,722 B1 | 1/2003 | Lopata |
| 6,519,568 B1 | 2/2003 | Harvey et al. |
| 6,538,577 B1 | 3/2003 | Ehrke et al. |
| 6,542,076 B1 | 4/2003 | Joao |
| 6,542,077 B1 | 4/2003 | Joao |
| 6,543,690 B1 | 4/2003 | Leydier et al. |
| 6,560,223 B1 | 5/2003 | Egan et al. |
| 6,574,603 B1 | 6/2003 | Dickson et al. |
| 6,600,726 B1 | 7/2003 | Nevo et al. |
| 6,608,551 B1 | 8/2003 | Anderson et al. |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B1 | 11/2003 | Johnson et al. |
| 6,671,586 B1 | 12/2003 | Davis et al. |
| 6,674,403 B1 | 1/2004 | Gray et al. |
| 6,678,255 B1 | 1/2004 | Kuriyan |
| 6,678,285 B1 | 1/2004 | Garg |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,771,981 B1 | 8/2004 | Zalewski et al. |
| 6,891,838 B1 | 5/2005 | Petite |
| 6,914,533 B1 | 7/2005 | Petite |
| 6,914,893 B1 | 7/2005 | Petite |
| 6,959,550 B1 | 11/2005 | Freeman et al. |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0012323 A1 | 1/2002 | Petite |
| 2002/0013679 A1 | 1/2002 | Petite |
| 2002/0019725 A1 | 2/2002 | Petite |
| 2002/0027504 A1 | 3/2002 | Petite |
| 2002/0031101 A1 | 3/2002 | Petite |
| 2002/0032746 A1 | 3/2002 | Lazaridis |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0158774 A1 | 10/2002 | Johnson et al. |
| 2002/0163442 A1 | 11/2002 | Fischer |
| 2002/0169643 A1 | 11/2002 | Petite |
| 2002/0193144 A1 | 12/2002 | Belski et al. |
| 2003/0001754 A1 | 1/2003 | Johnson et al. |
| 2003/0028632 A1 | 2/2003 | Davis |
| 2003/0030926 A1 | 2/2003 | Aguren et al. |
| 2003/0034900 A1 | 2/2003 | Han |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1* | 10/2003 | Murdock .................. 370/352 |
| 2003/0210638 A1 | 11/2003 | Yoo |
| 2004/0183687 A1 | 9/2004 | Petite |
| 2005/0190055 A1 | 9/2005 | Petite |
| 2005/0195768 A1 | 9/2005 | Petite |
| 2005/0195775 A1 | 9/2005 | Petite |
| 2005/0201397 A1 | 9/2005 | Petite |
| 2005/0243867 A1 | 11/2005 | Petite |

FOREIGN PATENT DOCUMENTS

| | | |
|---|---|---|
| EP | 07144 | 2/1998 |
| EP | 1096454 | 5/2001 |
| FR | 2817110 | 5/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| WO | WO 90/13197 | 11/1990 |
| WO | WO 98/00056 | 1/1998 |
| WO | WO 98/37528 | 8/1998 |
| WO | WO 99/13426 | 3/1999 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO02/052521 | 7/2002 |
| WO | WO03/007264 | 1/2003 |
| WO | WO 03/007264 | 1/2003 |
| WO | WO 03/021877 | 3/2003 |

OTHER PUBLICATIONS

Reuters, *Verizon Launches Wi-Fi Hot Spots*, May 13, 2003, http://www.wired.com/news/wireless/0,1382,58830,00.html (2 pages).

Verizon, *Verizon Broadband Anytime*, Copyright 2003, no month listed, https://www33.verizon.com/wifi/login/locations/locations-remote.jsp (2 pages).

*inCode Telecom Transforming Payphones into Wi-Fi Hot Spots*, Jan. 14, 2003, http://www.pocketpcmag.com/news/incode.asp (2 pages).

Bergstein, Brian, *US telco plans WiFi payphone*, May 12, 2003 http://www.news.com.au/common/story_page/0,4057,6420676%5E15306,00.html (2 pages).

*Bell Canada launches public wireless Internet hotspot pilot*, Dec. 10, 2002, http://www.bell.ca/en/about/press/release/2002/pr_20021210.asp (3 pages).

Stern, Christopher, *Verizon to Offer Wireless Web Link Via Pay Phones*, May 10, 2003, http://www.washingtonpost.com/ac2/wp-dyn?pagename=article&node=&contentId=A367 . . . (3 pages).

Rants and Ramblings, *Go Wireless . . . At A Payphone*, May 10, 2003, http://www.morethanthis.net/blog/archives/2003/05/10/000301.html (2 pages).

*Wayport's Value Proposition: To provide the industry's best high-speed Internet and business center experience for the airport passenger to stay productive*, http://www.wayport.net/airportsoverview (visisted Jul. 29, 2003) (2 pages).

*Wireless Access List—ATL Admirals Club*, http://www.ezgoal.com/hotspots/wireless/f.asp?fid=60346 (visited Jul. 29, 2003) (1 page).

*Wireless Access List—Atlanta Hartsfield International Airport*, http://www.ezgoal.com/hotspots/wireless/f.asp?fid=63643 (visited Jul. 29, 2003) (1 page).

Airpath Wireless, Inc., *Hot Spot Hardware*, Copyright 2003, http://www.airpath.com/programs/hardware/hardware.htm (visited Jul. 29, 2003) (2 pages).

*Phoneline / HPNA / HomePNA Networks*, http://www.homenethelp.com/web/howto/HomeNet-HPNA.asp (visited Jul. 29, 2003) (3 pages).

*to Starbucks and beyond: 802.11 wireless Internet access takes off*, CommunicationsSolutions.com, vol. 4, Issue 1, Q1 2003, pp. 8-9, no date listed.

Kooser, Amanda and Campanelli, Melissa, *Testing, 1-2-3*, Entrepeneur Magazine, Sep. 2003, pp. 27 and 30.

Hogan, Mike, *Call of the Wi-Fi*, Entrepeneur Magazine, Sep. 2003, pp. 39 and 42.

Westcott, Jil et al., "A Distributed Routing Design For A Broadcast Environment", IEEE 1982, pp. 10.4.0-10.4.5.

Khan, Robert E. et al., "Advances in Packet Radion Technology", IEEE Nov. 1978, vol. 66, No. 11, pp. 1468-1496.

Frankel, Michael S., "Packet Radios Provide Link for Distributed, Survivable C3 in Post-Attack Scenarios", MSN Jun. 1983.

Lauer, Greg et al., "Survivable Protocols for Large Scale Packet Radio Networks", IEEE 1984, pp. 15.1-1 to 15.1-4.

Gower, Neil et al., "Congestion Control Using Pacing in a Packet Radio Network", IEEE 1982, pp. 23.1-1 to 23.1-6.

MacGregor, William et al., "Multiple Control Stations in Packet Radio Networks", IEEE 1982, pp. 10.3-1 to 10.3-5.

Shacham, Nachum et al., "Future Directions in Packet Radio Technology", IEEE 1985, pp. 93-98.

Jubin, John, "Current Packet Radio Network Protocols", IEEE 1985, pp. 86-92.

Westcott, Jill A., Issues in Distributed Routing for Mobile Packet Radio Network, IEEE 1982, pp. 233 238.

Lynch, Clifford A. et al., Packet Radio Networks, "Architectures, Protocols, Technologies and Applications,".

Brownrigg, Edwin, "User Provided Access to the Internet,", Open Access Solutions, http://web.simmons.edu/chen/nit/NIT'92/033-bro.htm, Jun. 8, 2005-Jun. 9, 2005.

Khan, Robert E., "The Organization of Computer Resources into a Packet Radio Network," IEEE, Jan. 1977, vol. Com-25 No. 1, pp. 169-178.

Westcott, Jill A., "Issues in Distributed Routing for Mobile Packet Radio Network," IEEE 1982, pp. 233-238.

Khan, Robert E., "The Organization of Computer Resources into a Packet Radio Network," IEEE Transactions on Communications, Jan. 1977, vol. Com-25 No. 1, pp. 169-178.

* cited by examiner

SYSTEM AND METHOD FOR COMMUNICATING WITH A REMOTE COMMUNICATION UNIT VIA THE PUBLIC SWITCHED TELEPHONE NETWORK (PSTN)

CROSS REFERENCE TO RELATED APPLICATIONS

This application is a continuation-in-part of U.S. patent application Ser. No. 09/301,671, filed on Apr. 28, 1999, now U.S. Pat. No. 6,618,578, and entitled "System and Method for Communicating with a Remote Communication Unit Via the Public Switched Telephone Network (PSTN)," which is a continuation-in-part of U.S. patent application Ser. No. 08/895,720, filed on Jul. 17, 1997, and entitled "Transmitter for Accessing Pay-Type Telephones," now U.S. Pat. No. 5,926,531, which, in turn, is a continuation-in-part of U.S. patent application Ser. No. 08/825,576, filed on Mar. 31, 1997, and entitled "Transmitter for Accessing Automated Financial Transaction Machines," which claims the benefit of U.S. Provisional Patent Application Ser. No. 60/040,316, filed Feb. 14, 1997, and entitled "Card Replacement Transceiver For Use With Automatic Teller Machines," each of which are hereby incorporated by reference.

FIELD OF THE INVENTION

The present invention generally relates to communication systems, and more particularly to a system and method for communicating with a remote communication unit via the public switched telephone network (PSTN).

BACKGROUND OF THE INVENTION

In recent years, there has been tremendous growth in the telecommunications industry. This growth has been fueled, in large part, by the proliferation of the Internet. More particularly, one segment of the telecommunications industry relates to data communications. As is known, data communications relates to the communication of data (as opposed to voice) from one end point to another. Typically, some type of computer or computing device is located at each end point, each having a communication device (such as a modem) to carry out the necessary modulation and demodulation of the signal that is communicated between the two end points.

A typical system configuration includes two computers, or computing devices, remotely located, but configured to inter-communicate over the PSTN. As one example, such a system exists when communicating between a first computer located at a residential customer premises and a second computer located at, for example, a service provider. In a manner that is well known, the first computer may initiate the connection by instituting a dial-up procedure, whereby it establishes a connection across the PSTN to make a second computer located at, for example, a service provider location. Once the connection is established, data communications may be freely exchanged between the first computer and the second computer, over the PSTN.

Remote computing devices, such as laptop computers, electronic schedulers, palmcorders, and other similar devices (also referred to herein as personal access devices) can be similarly configured for communication with a remote computing device. In one configuration, a jack or I/O port may be provided on the personal access device to allow a direct electrical connection (via cable) between the personal access device and, for example, a RJ-11 phone jack. However, in many situations phone jacks are not readily available. Therefore, an alternative means for communicating between two remote computing devices is desired.

Cellular systems are known to provide one such configuration. Referring to FIG. 1, the system 10, as is known in the prior art, illustrates the data communications connection between the laptop computer 12 and a remote communication unit 14. The communication path established between laptop computer 12 and a remote communication unit 14 includes a cellular link 16 and a PSTN link 18. As is known, electrical hookups may be provided to electrically connect the computer 12 to a cellular phone 20. This "hookup" in part includes a cellular modem (not shown) within the computer 12. This cellular modem may communicate with this cellular phone 20 via a direct electrical connection. The cellular phone 20, in turn, communicates via electromagnetic waves to a nearby cellular base station 22 (located within the cell 24). The cellular base station 22 then relays this information to a mobile telephone switching office (MTSO) 26. In a manner that is known, the MTSO 26 may be disposed for communication with other cellular base stations (not shown), as well as the PSTN 18. Therefore, information may be communicated from the laptop computer 12 to the remote computing device 14 by way of cellular telephone 20, cellular base station 22, MTSO 26, and the PSTN 18.

The communication system 10 illustrated in FIG. 1 provides one configuration for communicating data between a transitory computing device (laptop 12) and a remote communication unit 14. However, existing configurations have several drawbacks. First, the communication channel established in a cellular link is inherently noisy and, therefore, unreliable. As a result, many errors can occur, leading to retransmissions of data, which slow down the effective communication link. In addition, most cellular service providers charge a relatively substantial fee for cellular phone usage. Therefore, a person is generally billed for each minute that they are communicating across the cellular phone 20.

Accordingly, an alternative configuration is desired that overcomes the shortcomings noted above.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for communicating between a personal data access device and a remote communication unit. In accordance with one aspect of the invention, a system for communicating with a remote communication unit via a public switched telephone network (PSTN) is provided for facilitating communications between a personal data access device and a remote communication unit. The personal access device executes a program that communicates with the remote communication unit via the PSTN. The system includes a radio frequency (RF) transceiver associated with the personal data access device and in communication with the program. The system also includes a public, pay-type telephone, electrically connected to communicate over the PSTN. The system includes a second RF transceiver interfaced with the telephone and configured for communication with the RF transceiver in the personal data access device. A controller interfaced with the telephone is responsive to communications received from the first RF transceiver. The controller is configured to seize a phone line, initiate, and establish a data communication link over the PSTN to the remote communication unit designated by the personal data access device. The controller is also configured to allow simultaneous voice and data communications over the PSTN. The controller and the program are also configured to maintain two-way communication between the personal data access device and the remote communication unit via the PSTN and the RF link. The controller is further configured to terminate the data communication link over the PSTN to the remote communication unit designated by the personal data access device upon receiving a termination communication from the first RF transceiver.

In accordance with another aspect of the present invention, a system for communicating with a remote communication unit via a public switched telephone network (PSTN) is provided for facilitating communications between a personal data access device and a remote communication unit. The personal access device executes a program that communicates with the remote communication unit via the PSTN. The system includes a radio frequency (RF) transceiver associated with the personal data access device and in communication with the program. The system also includes a communication device, electrically connected to communicate over the PSTN. The system includes a second RF transceiver interfaced with the communication device and configured for communication with the RF transceiver in the personal data access device. A controller interfaced with the communication device is responsive to communications received from the first RF transceiver. The controller is configured to seize a phone line, initiate, and establish a data communication link over the PSTN to the remote communication unit designated by the personal data access device. The controller is also configured to allow simultaneous voice and data communications over the PSTN. The controller and the program are also configured to maintain two-way communication between the personal data access device and the remote communication unit via the PSTN and the RF link. The controller is further configured to terminate the data communication link over the PSTN to the remote communication unit designated by the personal data access device upon receiving a termination communication from the first RF transceiver.

In accordance with another aspect of the present invention, a method for retrofitting a public-pay telephone to provide wireless data network services to totable computing devices via the public switched telephone network (PSTN) is provided. In accordance with this aspect of the invention, the method includes the steps of interfacing a low-power transceiver with a pay-type telephone, providing public access to the low-power wireless transceiver, and enabling a totable computing device to communicate with the PSTN interface via the low-power wireless transceiver. In accordance with another aspect of the present invention, a method for providing wireless data network services to a totable computing device via the public switched telephone network (PSTN) is provided. In accordance with this aspect of the invention, the method includes linking a low-power wireless transceiver to a PSTN interface, providing public access to the low-power wireless transceiver, and enabling the totable computing device to communicate with the PSTN interface via the low-power wireless transceiver.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
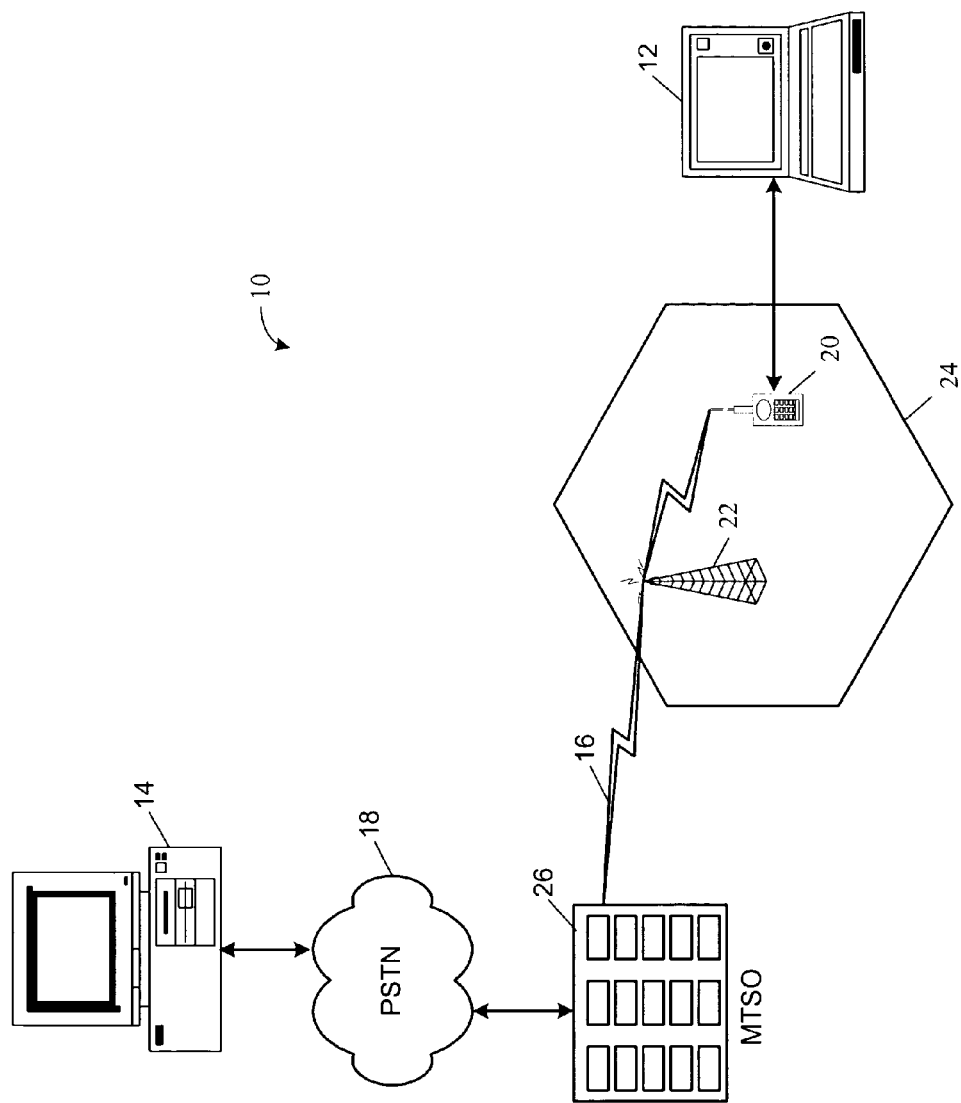
FIG. 1 is a diagram illustrating a prior art system in which a laptop computer is disposed for communication with a remote communication unit via a cellular link and a PSTN link.

Having summarized the present invention above, reference will now be made in detail to the description of the invention as illustrated in the drawings. While the invention will be described in connection with these drawings, there is no intent to limit it to the embodiment or embodiments disclosed herein. On the contrary, the intent is to cover all alternatives, modifications and equivalents included within the spirit and scope of the invention as defined by the appended claims.

Figure 2:
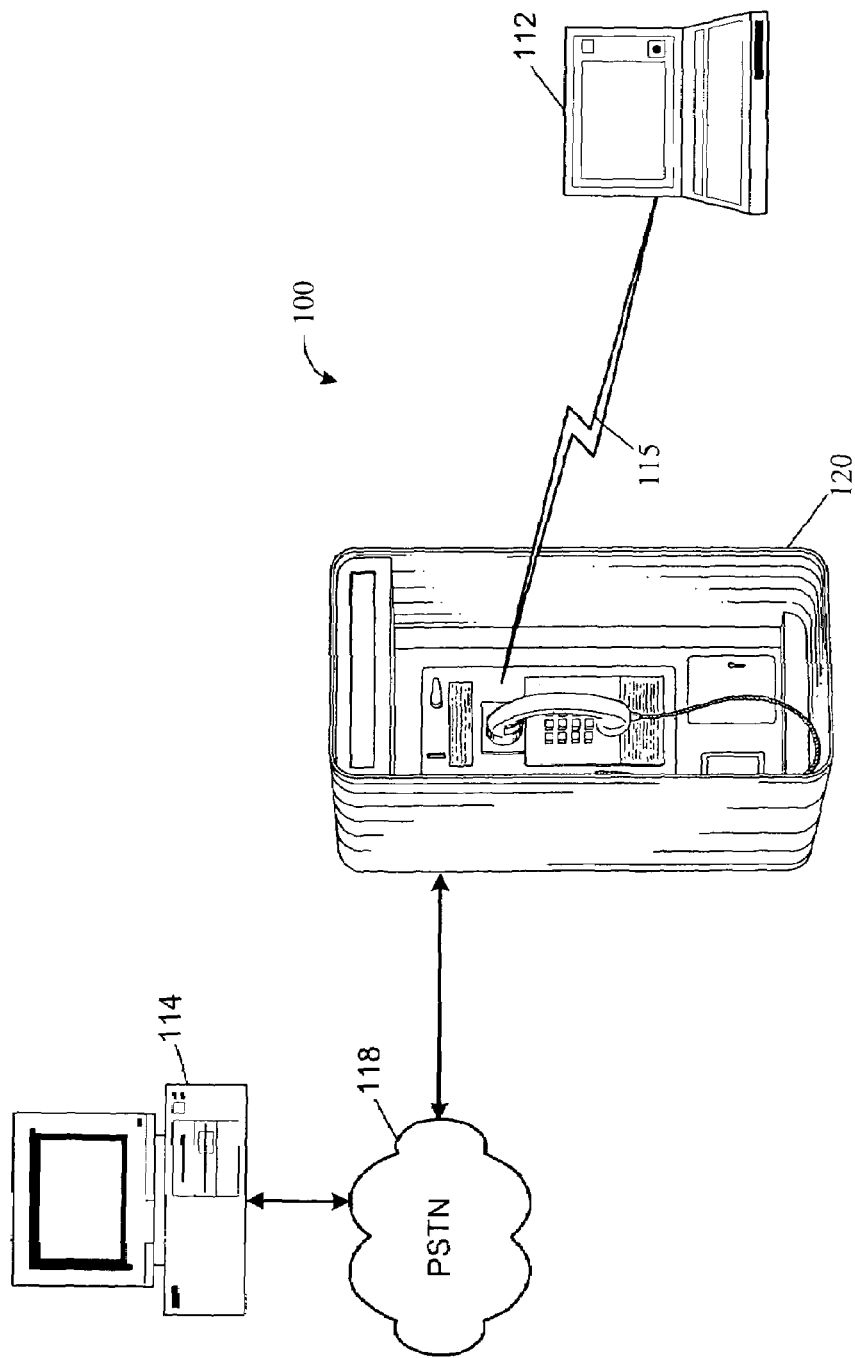
FIG. 2 is a diagram illustrating a system constructed in accordance with the present invention, wherein a computer is disposed for communication with a remote communication unit via an RF link and a PSTN link.

Reference is now made to FIG. 2, which is a diagram that illustrates a communication system 100 constructed in accordance with the present invention. In short, the present invention provides an alternative system and method for communicating between a personal data access device, such as a laptop computer 112, and a remote communication unit 114. In accordance with the invention, a communication link between the remote communication unit 114 and the personal data access device 112 is substantially across the PSTN 118. However, to accommodate the flexibility and remote nature of the personal data access device 112, a short segment of the communication link is established through electromagnetic waves, preferably in the form of a radio frequency (RF) link 115. One can appreciate that other forms of wireless communication, such as an infrared link, could also be used. A communication device—a public pay-type telephone 120 in the illustrated embodiment—provides for the translation and intercommunication between the PSTN 118 and the RF link 115.

It should be appreciated from the discussion herein, that the communication device may be provided in forms other than a public telephone 120. Indeed, communication devices may be provided in "nodes" that are disposed for communication with the PSTN 118, and which are inaccessible (hidden from view) from the general public. Nevertheless, they may be configured so that they may receive electromagnetic waves transmitted from a nearby personal data access device, in order to establish and maintain communications with a remote communication unit 114, in accordance with the present invention.

Remote communication unit 114 may be a variety of devices for communicating with personal access device 112. In accordance with one embodiment, remove communication unit 114 may provide an interface between the PSTN 118 and access to a network such as a LAN, WAN, an Intranet, or the Internet. In this embodiment, the remote communication unit 114 is a gateway between personal access device 112 and other remote computers on the remote network. In another embodiment, remote communication unit 114 may itself be configured as a data server for communication with the personal access device.

It should be appreciated that the personal data access device 112 may be any of a wide variety of devices, including but not limited to a desktop computer, a laptop computer, a palm-corder, or any of a number of hand-held computing devices. As is known, there are many hand-held computing devices, like schedulers and organizers, that have communication capability. Additionally, smart cards or similar personal transmitting devices with two-way, stored-value capabilities may be used. Devices such as these may be modified to include an RF transceiver and other necessary components to operate in accordance with the present invention. Personal data access device 112 may communicate with remote devices allowing a user to communicate data of personal and public nature. For example, a user may use the personal access device to use a web browser to access public Internet web pages. Alternatively, personal access device 112 may communicate with a remote server to download private, personal information such as email or calendar entries.

In operation, a user of the personal data access device 112 may use the device 112 in accordance with its ordinary functionality (e.g., computing, scheduling, etc.). When, however, it. is desired to access and inter-communicate with a remote computing device 114, the personal data access device 112 may be readily configured to establish this communication. Indeed, in one embodiment, a personal data access device 112 may be configured, consistent with prior art devices, to establish communication with a remote communication unit 114 through a direct PSTN connection. In this regard, the device 112 will be connected to, for example, a phone jack via a direct cable connection.

If, however, a direct cable connection is not a viable option (i.e., the user of the personal data access device 112 is not near an accessible phone jack), then an alternative means of communication between the device 112 and the remote communication unit 114 may be established and maintained in accordance with the present invention. By way of illustration, consider a person waiting on a flight in an airport wishing to check his or her e-mail messages, by dialing into a server at his or her place of employment, or an Internet service provider. In accordance with the present invention, the person may simply use the device 112 to initiate a dialout procedure via an RF link 115 through a nearby communication device such as telephone 120. It is assumed, for purposes of this illustration, that the nearby communication device incorporates a transceiver and other circuitry (discussed in connection with FIG. 3) in accordance with the present invention. Thus, it will be appreciated that the telephone 120 of the present invention will include internal circuitry that is not presently a part of standard telephone circuitry. In this regard, reference is made to FIG. 3, which is a block diagram illustrating the basic components of this circuitry inside telephone 120. In the illustrated preferred embodiment, the telephone 120 includes a RF transceiver 122, an interface circuit 124, telephone circuitry 126, a handset 128, and a controller 130. The block denoted as "telephone circuitry" 126 should be understood as comprising components that are contained within standard telephones. Specifically, a typical telephone 120 will include an interface circuit 124, telephone circuitry 126, and handset 128. The interface circuit 124 refers to the line driver and other interface circuitry that interfaces a telephone with the two wire pair of the local loop.

In accordance with the present invention, additional circuitry, including a transceiver 122 and a controller 130 are integrated within the telephone 120. It should be appreciated that, in accordance with concepts and teachings of the present invention, the transceiver 122 need not be a RF transceiver, but could employ other technologies as well, such as infrared, ultrasonic, etc. However, in accordance with the preferred embodiment a RF transceiver 122 was selected. Indeed, in accordance with the preferred embodiment of the present invention a 900 MHz RF transceiver 122 was selected. In recent years, many cordless telephones have begun using 900 MHz RF transmission, which has been found to deliver better noise immunity in short distance RF communication. The classification of 900 MHz is rather loosely used, as precise communication frequencies typically vary slightly. The specific RF transceiver of the preferred embodiment may be the TR1000, manufactured by RF Monolithics, Inc.

As is known, the TR1000 hybrid transceiver is well suited for short range, wireless data applications where robust operation, small size, low power consumption, and low-cost are desired. All critical RF functions are contained within the single hybrid chip, simplifying circuit design and accelerating the design-in process. The receiver section of the TR1000 is sensitive and stable. A wide dynamic range log detector, in combination with digital automatic gain control (AGC), provides robust performance in the presence of channel noise or interference. Two stages of surface acoustic wave (SAW) filtering provides excellent receiver out-of-band rejection. The transmitter includes provisions for both on-off keyed (OOK) and amplitude-shift key (ASK) modulation. The transmitter employs SAW filtering to suppress output harmonics, for compliance with FCC and other regulations.

Additional details of the TR1000 transceiver need not be described herein, because the present invention is not limited by the particular choice of transceiver. Indeed, numerous transceivers may be implemented in accordance with the teachings of the present invention. Such other transceivers may include other 900 MHz transceivers, as well as transceivers at other RF frequencies. In addition, infrared, ultrasonic, and other types of transceivers may be employed, consistent with the broad scope of the present invention. Further details of the TR1000 transceiver may be obtained through data sheets, application nodes, design guides (e.g., the "ASH Transceiver Designers Guide"), and other documentation which are published and known by persons in the art. One skilled in the art would appreciate that a wide range of acceptable transceivers and frequencies may be used within the scope and spirit of the invention. For example, transceivers manufactured by Chipcon and Texas Instruments could also be incorporated. The invention is also not limited by frequency, and thus transceivers operating in the 2.4 GHz and 5 Ghz spectrum are also within the scope of the invention. Furthermore, the transceivers may use a number of wireless methods such as single channel frequency hopping, multi-channel frequency hopping, or direct sequence spread spectrum.

Figure 3:
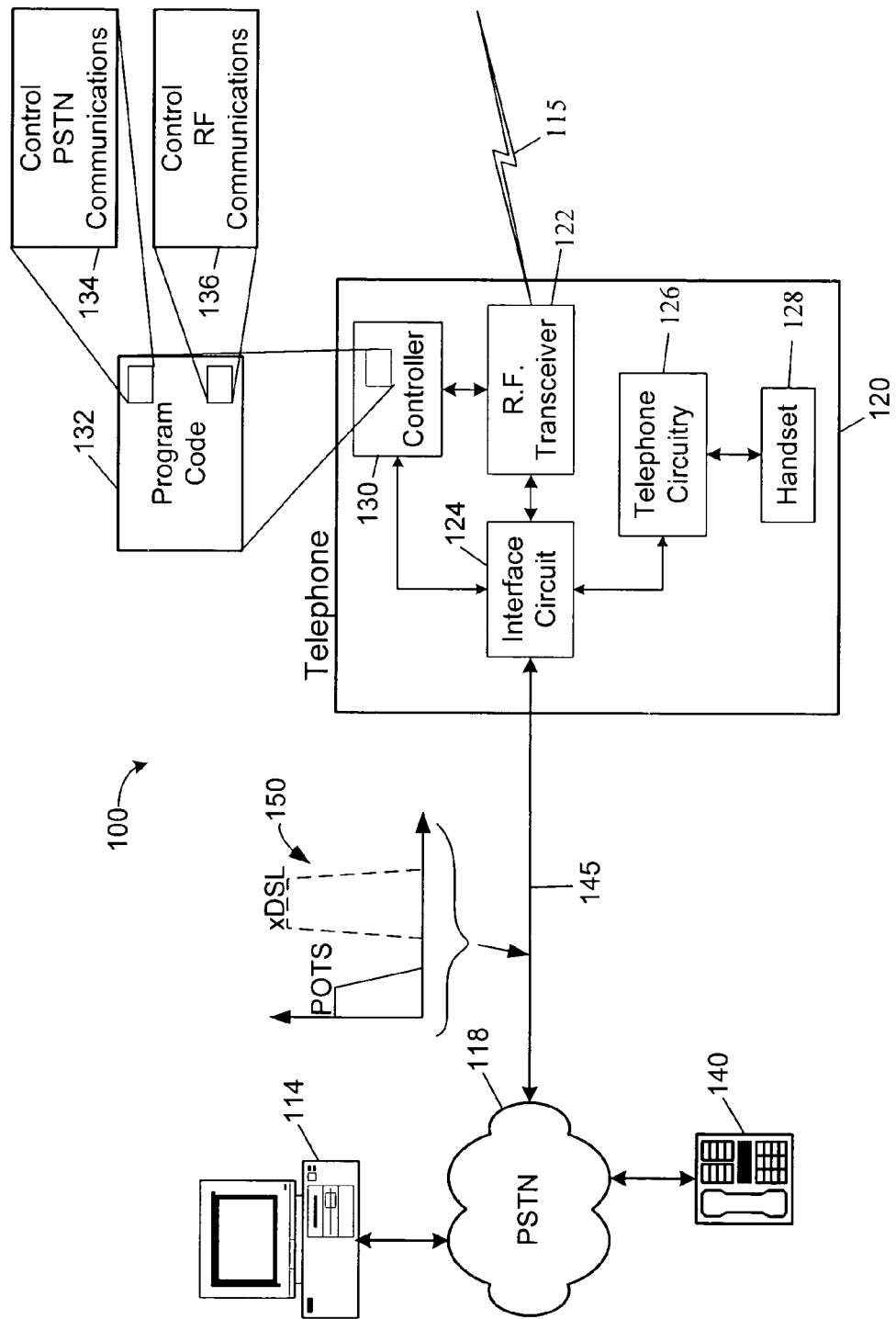
FIG. 3 is a block diagram illustrating certain components within a communication device (e.g., a telephone), in accordance with one embodiment of the present invention.

In keeping with the description of FIG. 3, the telephone 120 also includes a controller 130. The controller 130, as illustrated, is disposed for communication with the interface circuit 124 as well as the transceiver 122. The controller 130 may be provided in a variety of forms. For example, the controller may be provided through dedicated circuitry. Alternatively, the controller 130 may be implemented through more general-purpose circuitry, which may include a CPU (not shown) and a memory (not shown). In a manner that should be appreciated, the memory may store program code 132 that includes a series of instructions that may be executed by the CPU. In accordance with the inventive aspects, portions of the program code may include a first segment 134 that is configured to control communications between the telephone 120 and a remote communication unit 114 over the PSTN 118. A second segment 136 may be configured to control RF communication between the telephone 120 and personal data access device 112 over of the RF link 115.

It should be appreciated that persons having ordinary skill in the art (an electrical circuit designer) will readily appreciate how the controller 130 may be implemented, without requiring undue experimentation. Indeed, the specific implementation of the controller 130 will necessarily vary depending upon the specific transceiver 122 and the details of the interface circuit 124. What is significant for purposes of the present invention is that the controller 130 is designed to control the operation of the RF transceiver 122, so that the transceiver 122 effectively communicates with the personal data access device 112. Likewise, the controller 130 controls the interface circuit 124 so that the interface circuit may effectively communicate, via the PSTN 118, with a remote communication unit 114. Furthermore, it should be understood that the RF transceiver 122 may be able to handle simultaneous communication between multiple personal data access devices at a time. Under these circumstances, controller 122 may be required to facilitate the necessary handshaking to allow the simultaneous communications.

In accordance with the broader aspects of the present invention, various embodiments of the controller 130, and system 100, may be implemented. In one embodiment, the system 100 may be designed so that all communications between the telephone 120 and the remote communication unit 114, via the PSTN 118, take place within the POTS (plain old telephone system) frequency band, which extends between approximately 0–4 kHz. In such an embodiment, if a person is using the telephone 120 in its ordinary fashion (i.e., by talking over the handset), then the controller 130 will be configured to prevent another person from establishing a connection, via the RF link 115, with the PSTN 118. Likewise, if a person has established a connection with a remote communication unit 114 via the PSTN 118 and RF link 115, then the controller is configured to prevent a person from disrupting this communication link by lifting the handset 128 and attempting to dial out, or otherwise. In one embodiment, once a communication link between the remote communication unit 114 and personal data access device 112 has been established, a person lifting the handset 128 to place a telephone call will simply hear a "dead" line, indicating that telephone is unavailable for current use. In alternative embodiments, the controller 130 may be interfaced with the telephone circuitry 126 to provide, for example, a recording, so that the person lifting the handset may hear a recorded message that the line is currently in use, and that they should try again later. Such a configuration may be preferred, because such a recording would prevent a person from confusing a "dead" line as indicating that the telephone 120 is out of order.

In accordance with an alternative configuration of the present invention, the system 100 may be configured to allow simultaneous communication with multiple remote units. In one such configuration, the POTS frequency band may be dedicated for conventional voice communication between the handset 128 and a remote telephone 140. An alternative service, such as DSL (digital subscriber line), ISDN (integrated services digital network), T1 line, or other, may be implemented to handle data communications. As is known, and illustrated by reference 150, DSL communications occur in a frequency band that is above the POTS frequency band. Therefore, the controller 130 and interface circuit 124 may be configured to allow simultaneous voice and data communications over the same two wire pair local loop 145 to two separate remote destinations, without signal interference. In such an embodiment, data communicated between the personal data access device 112 and a remote communication unit 114 may be communicated over the PSTN between the central office (not shown) and a telephone 120 at a higher frequency range. As is known, the PSTN may include Therefore, the data communications may take place between the personal data access device 112 and a remote communication unit 114 at the same time that voice communications may take place between the handset 128 and the remote telephone 140, sharing the same local loop 145.

Figure 4:
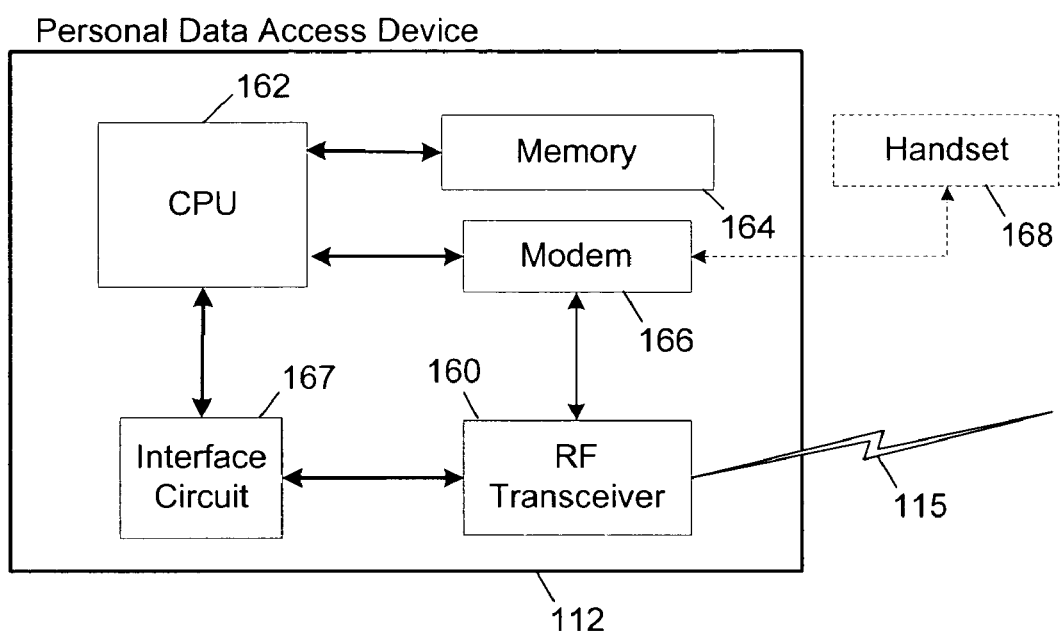
FIG. 4 is a block diagram illustrating certain components within a personal data access device (e.g., a laptop computer), in accordance with one embodiment of the present invention.

Reference is now made to FIG. 4, which is a block diagram that illustrates the personal data access device 112 in accordance with one embodiment of the present invention. As previously described, the personal data access device 112 may be in the form of a personal computer, such as a laptop computer. As is known, a laptop computer includes a CPU 162, memory 164, as well as other circuitry or circuit cards that are utilized in the operation of the device 112. In accordance with the present invention, a transceiver 160 is also provided in order to establish and maintain communications with the transceiver 122 described in connection with FIG. 3. A modem 166 may also be provided for modulating the signal before delivering the signal to the RF transceiver 160. In some implementations, however, the modem 166 may be integrated as a part of the transceiver 160. Accordingly, although a variety of transceiver technologies may be employed, it will be appreciated that transceiver 160 will be compatible with the transceiver 122. An interface circuit 167 may also be provided and configured to interface the CPU 160 with the RF transceiver 160.

Of course, the specific implementation of the interface circuit 167 will necessarily depend upon the specific transceiver 160 and CPU 162 that are implemented. Program code (not shown) stored within the memory 164 may be used to instruct the CPU 162, so as to control the operation of the RF transceiver 160.

In another embodiment, a handset 168 (illustrated in dash line) may be provided and coupled to the modem 166. Implementing technology such as simultaneous voice data (SVD) technology, the device 112 may communicate both voice and data information with a remote communication unit 114, through the communication path provided by the inventive system 100.

Figure 5:
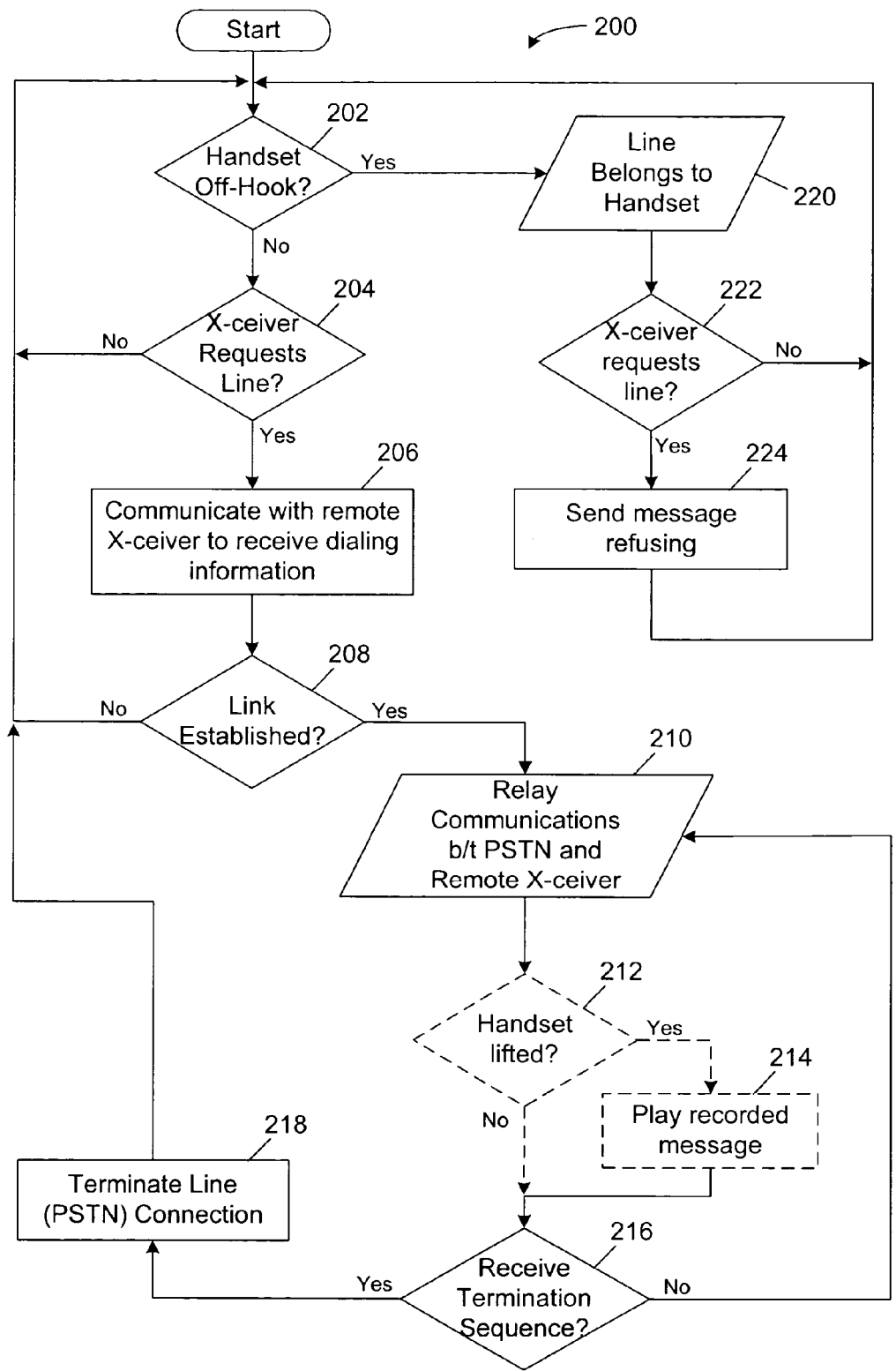
FIG. 5 is a flowchart illustrating the top-level functional operation of a communicating device constructed in accordance with one embodiment of the present invention.
Figure 6:
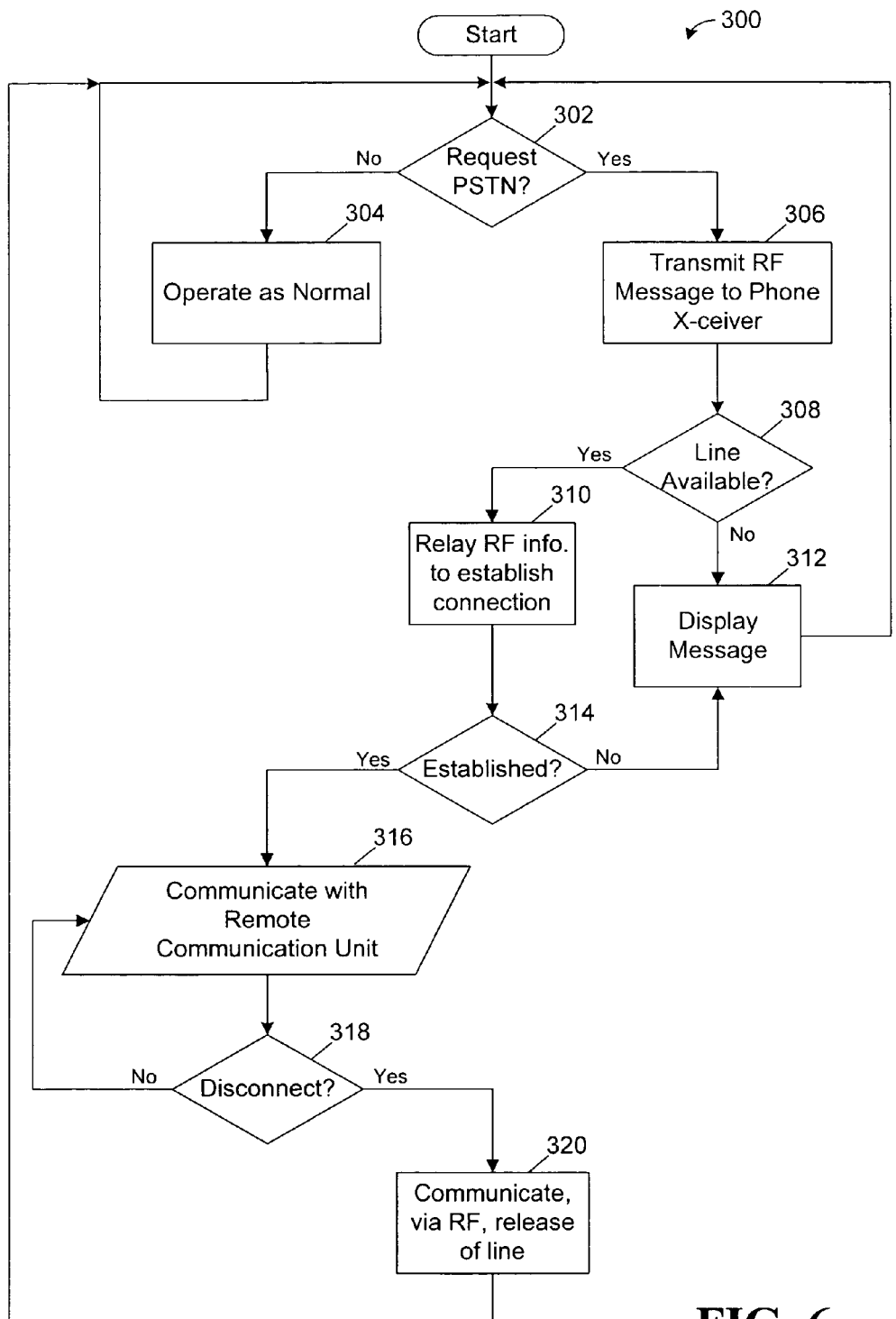
FIG. 6 is a flowchart illustrating the top-level functional operation of a personal data access device constructed in accordance with one embodiment of the present invention.

Having described the principal hardware components of a system 100 constructed in accordance with the invention, reference is now made to FIGS. 5 and 6, which are flowcharts that illustrate the top-level functional operation of a telephone 120 and a personal data access device 112, in accordance with one embodiment of the invention. Referring first to FIG. 5, a flowchart 200 illustrates the operation of a telephone 120 (or other communication device), constructed in accordance with one aspect of the present invention. As mentioned above, a system constructed in accordance with the invention may be implemented in various configurations. One configuration may allow simultaneous communication between a personal data access device 112 with a remote communication unit 114, and the telephone handset 128 with a remote telephone 140. In alternative configuration, such simultaneous communication is prohibited. A flowchart 200 of FIG. 5 illustrates the top-level operation of a system constructed in accordance with the alternative (i.e., no simultaneous communication) configuration.

After a power up reset, for example, the system may evaluate whether the telephone handset 128 is on hook or off hook (step 202). If the handset is off hook, then the controller 130 dedicates communications over the PSTN line 145 to the handset 128 (step 220). In one implementation, the controller 130 may check to determine whether the transceiver 122, in response to a request from the personal data access device 112, has requested communication over the PSTN (step 222). If so, the controller may control a reply message via the RF link 115 to the personal data access device 112, and inform the personal data access device 112 that the line is busy, and therefore unavailable (step 224). Thereafter, the controller may loop back to step 202. So long as the handset 128 remains off hook, the PSTN communication link 145 will "belong" to the handset 128. Once, however, the handset 128 is replaced and the telephone is no longer off hook, then the controller may check to determine whether the transceiver 122 has requested the PSTN communication link 145 (step 204). If not, the controller may loop on steps 202 and 204, until either the handset 128 is taken off hook or the transceiver 122 has requested the PSTN communication link 145. Once the transceiver 122 has requested communication over the PSTN link 145, then the controller controls communications between the transceiver 122 in the personal data access device 112 to retrieve initialization and start-up informnation. For example, the personal data access device 112 may communicate to the controller 130 the telephone number that is to be dialed in order to establish a communication link with a remote communication unit 114. The signaling that takes place in order to establish this link need not be described herein, as it should be appreciated by persons skilled in the art.

The controller may verify (step 208) that the communication link has been properly established. If not, the controller may return to step 202, and proceed as described above. If, however, the communication link has been properly established, then the controller will control the operation of the telephone 120 to relay communications between the PSTN 118 and the remote transceiver 160 of the personal data access device 112. In an embodiment that prohibits simultaneous communication between the device 112 and remote communication unit 114, and the handset 128 and a remote telephone 140, the controller 130 may be configured to check (during data communications) to determine whether the handset 128 is lifted (step 212). If so, the controller 130 may be configured to control the playback over the handset 128 of a recorded message (step 214). Such a message may inform the person lifting handset that the line is temporarily in use and that the person should try back again later. Such a feature helps to prevent confusion by the person as to whether the line may be dead, or telephone malfunctioning.

As the controller 130 operates to relay communications between the PSTN 118 and the personal data access device 112, it may also check for a termination sequence (step 216). Specifically, the controller 130 may evaluate messages received from the personal data access device 112 for a particular sequence that would identify the desire on the part of the device 112 to terminate the connection with the remote communication unit 114. Of course, in the preferred embodiment, program code within the device 112 will communicate this desire to the remote communication unit 114 before issuing a termination sequence to the controller 130. Once such a termination sequence is received, the controller then controls the signaling to terminate the PSTN connection (step 218). Thereafter, the controller may return to step 202 and proceed as described above.

Reference is now made to FIG. 6, which is a flowchart 300 illustrating the top-level functional operation of the control aspect of one embodiment of the personal data access device 112. At a first step (step 302) the device 112 may determine whether it wishes to request communication with a remote device over the PSTN. If not, the device 112 may continue to operate in its normal, functional fashion (step 304). If, however, the PSTN communication connection is desired, then the device 112 will transmit, via electromagnetic waves, a certain signaling sequence (step 306) to the transceiver 122 integrated within the telephone 120, or other communication device. The device 112 may then check for a responsive message (sent from the telephone 120) to determine whether the line is available (step 308). As illustrated in FIG. 5, the controller 130 of the telephone 120 may send a reply message if the line is unavailable (step 224). If step 308 determines that the line is not available, or it receives no response at all (indicating that there is no nearby transceiver connected to the PSTN), then it may display an appropriate message to the user, and thereafter return to step 302. If, however, a line is available, then the device 112 relays or exchanges the necessary information, via electromagnetic waves, with the transceiver 122 of the telephone 120 (step 310), in order for the controller 130 to establish a communication link with remote communication unit 114. The device 112 may then check to determine whether a communication link with remote communication unit 114 was properly established (step 314). If not, it may display an appropriate message to the user (step 312) and returns to step 302. If, however, a proper communication link was established between the controller 130 and the remote communication unit 114, then the device 112 will proceed to communicate with the remote communication unit 114 via RF link 115 and the PSTN 118.

This communication will continue until the device 112 seeks to terminate the connection. Therefore, the device 112 may evaluate whether it wishes to disconnect (step 318) the connection. If not, the flowchart 300 indicates that the device may simply loopback to step 316, where communication continues. If, however, the device 112 wishes to disconnect the communication link, then it communicates via electromagnetic waves appropriate disconnect signaling (step 320) to the controller 130 of the telephone 120. Thereafter, the device 112 may return to step 302, where it may proceed as previously described.

As explained above, RF transceiver 122 may be able to handle simultaneous communication between more than one personal data access device 112 at a time. In this situation, each device 112 may maintain a communication link with remote communication unit 114 at the same time according to flowchart 300.

Figure 7:
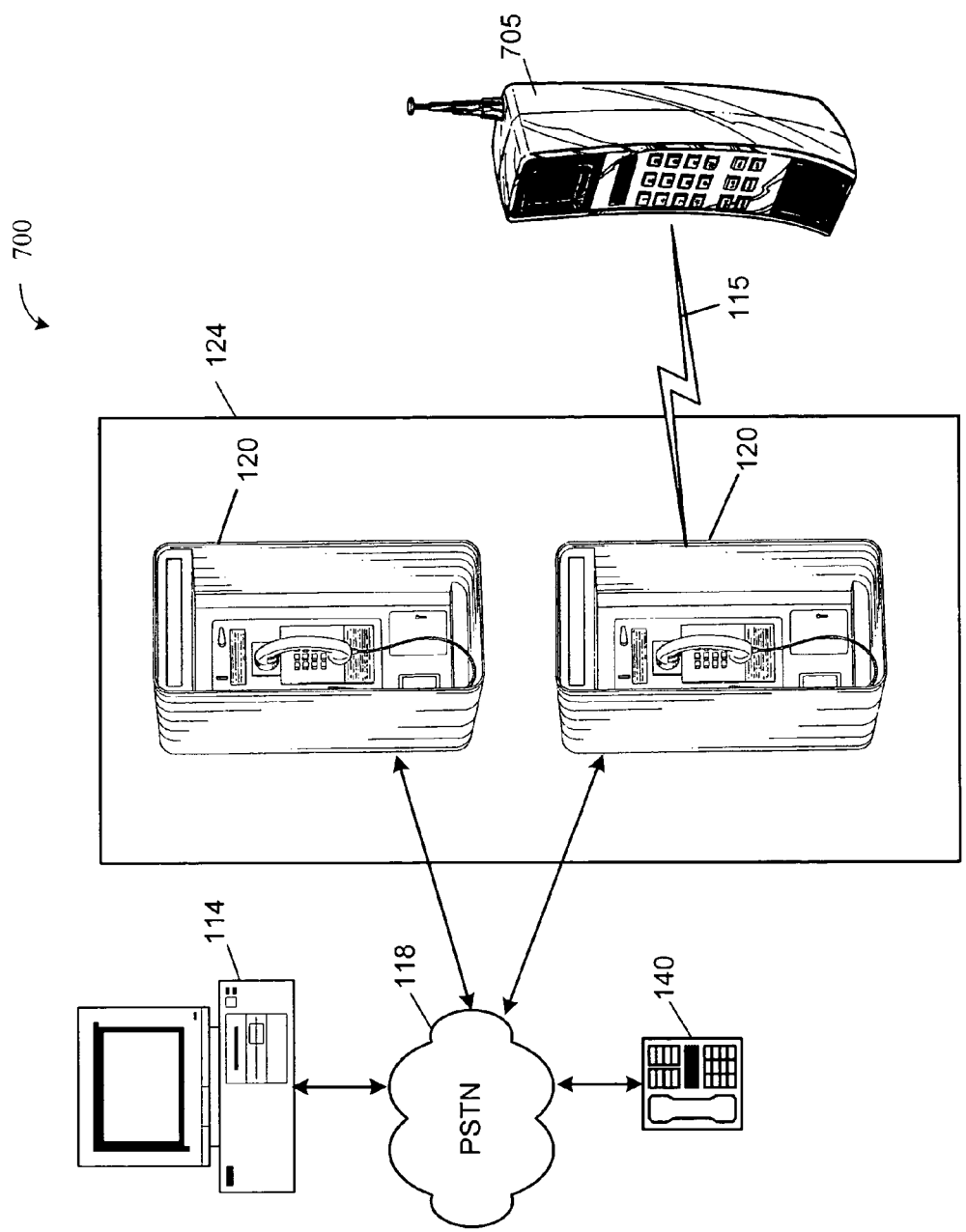
FIG. 7 is a diagram illustrating a system constructed in accordance with the present invention, wherein a handset is disposed for communication with a plurality of communication devices on a network.

Now looking to FIG. 7, system 700 is depicted in which a portable handset 705 communicates with remote communication unit 114. As described above in relation to system 100, the personal access device 112 (FIG. 4) may be any one of a number of totable, or fixed, devices such as a desktop computer, laptop computer, or PDA. In accordance with system 700, personal data access device 112 of FIG. 4 is embodied as a portable handset 705. The portable handset 705 enables a user to communicate voice information to remote communications unit 114. The handset 705 includes a microphone to receive voice signals and a speaker to convert received communications into audible sound. Handset 705 may already be configured to use cellular technologies such as GSM, CDMA, or TDMA and may be implemented with analog or digital transmission signals.

The voice signals may be transmitted between remote communications device 114 and handset 705 in at least two ways. In a first embodiment, packeted voice signals are sent from portable handset 705 over RF link 115 to telephone 120. Telephone 120 converts the packeted data into analog voice signals which are then communicated across the POTS voice band of the PSTN. In a second embodiment, packeted voice signals are sent over RF link 115 and forwarded across the PSTN to remote communication unit 114 where they may be decoded into the analog signal. These processes will now be described in more detail.

The portable telephone 705 of the first embodiment of system 700 digitizes a user's analog voice signals into data packets. The digitization process is typically performed by a digital signal processor (DSP) embedded within the portable phone 705. The data packets are then delivered across RF link 115 from RF transceiver 160 (FIG. 4) to RF transceiver 122 in telephone 120. The data packets may be assembled using the well known internet protocol (IP) which provides error checking and addressing. Telephone 120 may also have an embedded DSP for decoding the data packets sent from the RF transceiver 160 back into analog voice signals. The voice signals are then circuit-switched as a normal telephone call to provide POTS band voice communication over the PSTN 118 to remote telephone 140. One will appreciate that according to this embodiment, because telephone 120 circuit switches the call between the telephone 120 and the remote telephone 140, telephone 120 is not be able to accommodate simultaneous communication using handset 128 (FIG. 3) on the same connection to the PSTN. Thus, the functional operation described by system 200 (FIG. 5) would be implemented to provide access to telephone 120 and control access to the handset 128 on telephone 120.

One will appreciate that communications in the opposite direction, from remote telephone 140 to portable telephone 705 operate in a reverse manner. Analog voice signals communicated from remote telephone 140 are digitized into packeted data by circuitry, such as a DSP, within telephone 120. The packeted data is then delivered to portable phone 705 which decodes the packeted data and a speaker converts the resulting signal into audible sound.

The user initiating a voice communication may indicate a call destination by dialing a telephone number of remote telephone 140 or other identification via the user interface of personal access device 112. This destination identification is sent along with the voice data to provide telephone 120 with the destination for a particular communication. For example, in the case of a typical telephone call, the user may dial a telephone number identifying the phone address of a desired call destination. Telephone 120 includes telephone circuitry 126 designed to decode this information and route the call to the provided destination over the POTS voice band. In effect, the first embodiment of system 700 provides the voice communication capabilities of telephone 120 remotely via the portable telephone 705.

In a second embodiment of system 700, as in the first embodiment, portable telephone 705 digitizes a user's analog voice signals into packeted data signals which are transmitted to telephone 120. However, in contrast to the first embodiment of system 700 described above, telephone 120 does not convert the packeted data into a POTS band voice signal. Rather, the packeted data signals may be relayed via packet switching over PSTN 118 to remote communication unit 114. Remote communication unit 114 may then provide the circuitry, such as a DSP, to decode the packeted data into an analog voice signal and then route the voice communication to remote telephone 140 via the POTS voice band. As in the first embodiment, the remote telephone 140 may be identified by a telephone number provided by a user of the handset 168.

As in the prior embodiment, one will appreciate that communications in the opposite direction, from remote telephone 140 to portable telephone 705 will be performed in a reverse manner. Analog voice signals communicated from remote telephone 140 are digitized into packeted data by circuitry, such as a DSP, within remote communication unit 11 4. The packeted data is then delivered across the PSTN to telephone 120. Telephone 120 relays the packeted data to portable phone 705 which decodes the packeted data and the speaker converts the resulting signal into audible sound.

One will appreciate that according to this second embodiment telephone 120 is able to accommodate simultaneous voice communication using handset 128 (FIG. 3) on the same connection to the PSTN as portable telephone 705. Thus, the functional operation described by system 300 (FIG. 6) would be implemented to control access to the telephone 120 by portable handset 705.

It will be appreciated that this embodiment enables physical placement of a remote communication unit 114 in a location that enables a user to make what is typically a long distance call with only charges related to the local access at telephone 120 and any other connection fees associated with accessing the remote communication unit 114. Thus, using software and computer techniques that are now well known, a voice call can be placed over the PSTN, utilizing the Internet, to a very distant remote telephone 140, whereby long distance telephone calling is effectively achieved without the associated long distance connection fees.

Further embodiments to system 700 may include a roaming feature enabling the RF transceiver 160 (FIG. 4) to communicate with a RF transceiver 122 (FIG. 3) providing the strongest signal link strength in a given physical location. As a user of handset 705 moves about a geographic area within a network 124 of telephone 120 locations, the circuitry associated with RF transceiver 160 monitors the signal link strength of the connection with the current RF transceiver 122, and the strength of another available RF transceiver 122 in the network. If the signal link of the current RF transceiver becomes weaker than the signal of another RF transceiver 122 on the network 124, the RF transceiver 160 may transfer the current communication to the alternate RF transceiver 122 with the strongest signal. It will be understood that this embodiment provides handset 705 with a system for periodically monitoring the signal strength of surrounding RF transceivers 122 associated with a telephone 120. Accordingly, the RF transceiver 122 with the strongest signal may be selected for communication in order to establish the most reliable link.

It will be appreciated that the embodiments of system 700 described above may provide an alternative to traditional wireless phone usage. For example, the use of traditional wireless phones may be severely limited in certain locations, such as when a user is underground or surrounded by tall buildings. Instead, a handset 705 only need be positioned within the range of a RF transceiver 122 located within a telephone 120 or communication device. Such applications find use in hotels, office buildings, factories, city streets, restaurants, malls, and shopping centers.

Figure 8:
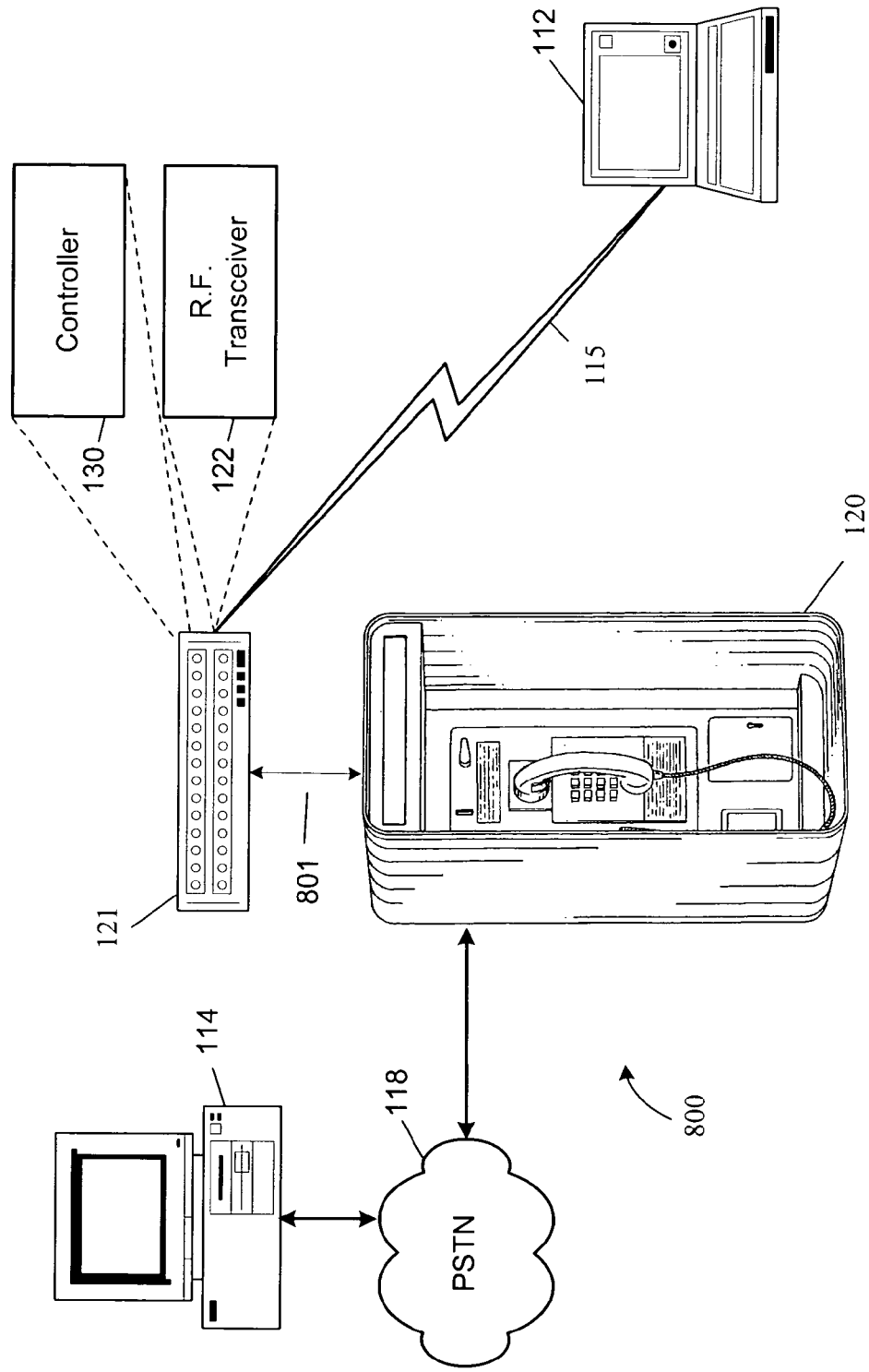
FIG. 8 is a diagram illustrating a system constructed in accordance with the present invention, wherein the controller and transceiver associated with the communication device are physically located outside of the communication device.

As described above in relation to systems 100 and 700, the RF transceiver 122 and controller 130 are preferably located within the housing of a telephone 120 in order to save space, reduce cost, and provide physical protection. However, as depicted by system 800 in FIG. 8, it will be appreciated that the RF transceiver 122 and controller 130, associated with the telephone 120, may be located outside the physical confines of the telephone 120 for ease of installation, ease of service, or space restrictions. Additionally, placing the RF transceiver 122 in a location remote from the telephone 120 housing may increase reception and reduce RF interference. The RF transceiver 122 and controller 130, may be placed in a separate module 121, yet continue to share the same connection to the PSTN 118 as used by the telephone. By using the same connection between the telephone 120 and the PSTN 118, existing infrastructure may be utilized to provide communications with a remote communication unit 114 without running additional network cables. The separate module 121 may be located just outside the telephone 120 housing, or may be remotely located by several feet in order to decrease visibility, increase reception, or provide a decreased risk of theft. Despite the greater proximity from the telephone 120, the RF transceiver 122 and controller 130, now housed within separate module 121, may interface through interface 801 to the interface circuit 124. Interface 801 may be a wired or wireless connection using well known communication methods. Interface 801 may provide a communication channel between the RF transceiver 122 and controller 130 to circuit 124 or other circuitry located within the telephone.

Figure 9:
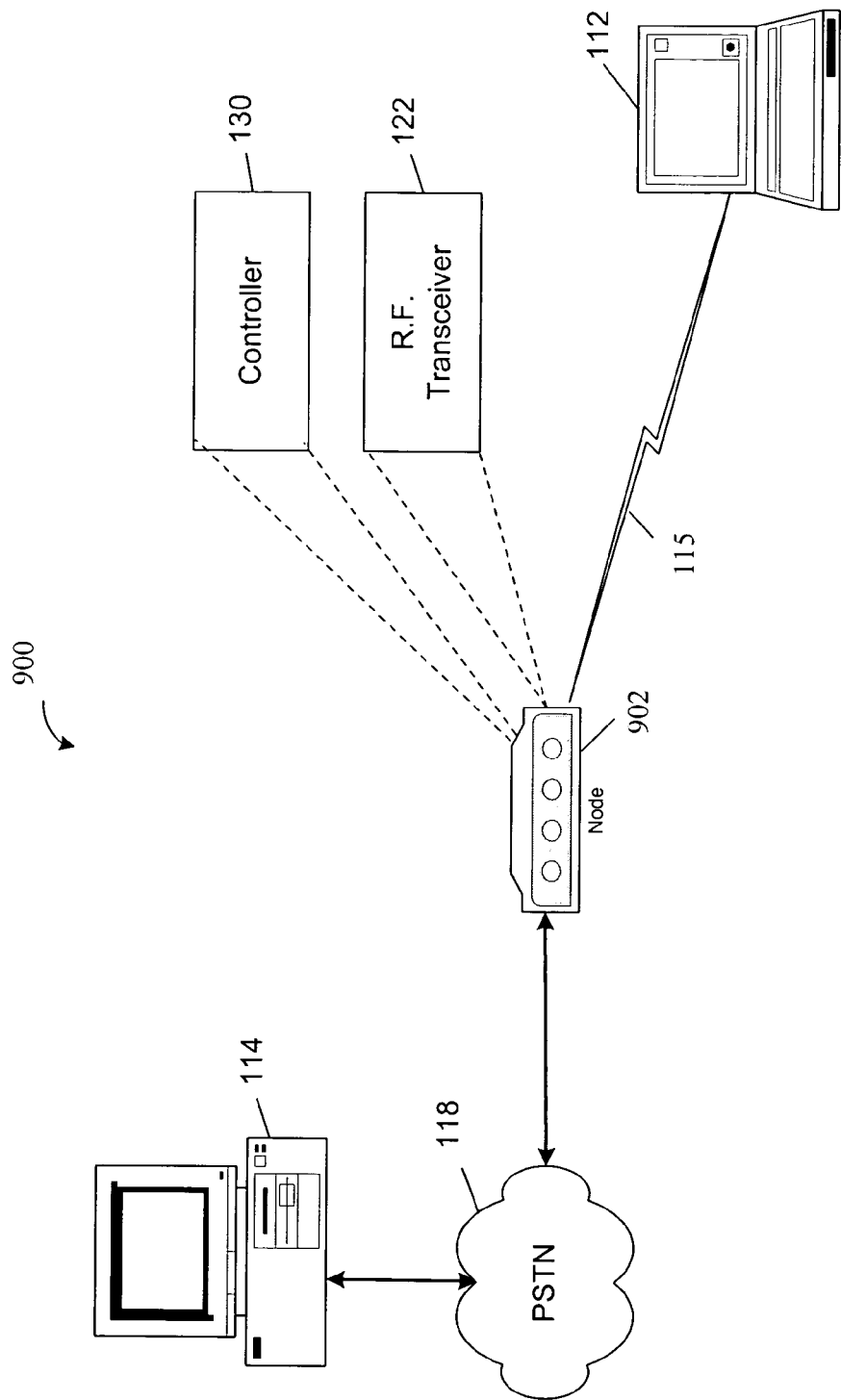
FIG. 9 is a diagram illustrating a system constructed in accordance with the present invention, wherein the communication device is a node.

As mentioned above, in addition to telephone 120, a communication device may comprise any type of communication "node" connected to the PSTN. Such a node may be a DSL modem 902 with an integrated RF transceiver 122 and controller 130 as shown in system 900 in FIG. 9. DSL modem 902 uses an existing connection to the PSTN 118 to provide data communication. DSL modem 902 is publicly accessible by anyone within the proximity of the integrated low-power RF transceiver. Such "nodes" are often hidden out-of-site of a customer's view in a stationary object such as an electric sign or billboard. Alternatively the nodes can be displayed as an indication to a user that the wireless service is available. A "node" may also describe a public, pay-type telephone which has been disabled conventional voice-type telephone calls using the integrated handset 128, but is configured for remote access by a personal data access device 112 according to systems 100, 700, 800, or 900.

The systems and methods of the described systems 100, 700, 800, or 900 may be used to provide publicly accessible wireless access to personal data access devices wherever communication devices already exist. Because the wiring infrastructure to the PSTN is already in place, retrofitting existing communication devices to handle wireless data access can provide a new method of generating revenue from existing business assets. For example, the cellular phone boom has left pay-phone companies with decreasing revenues. Besides the convenience and low prices of cellular phones, current cellular phone plans include free long distance. Thus, the demand for voice calls on pay-phones has declined, leaving pay-phone companies with assets returning very little profit. While voice calls using pay phones are on the decline, the use of wireless data networking by consumers is on the rise. Thus, by retrofitting pay-type telephones with wireless access, new life is breathed into these assets.

Figure 10:
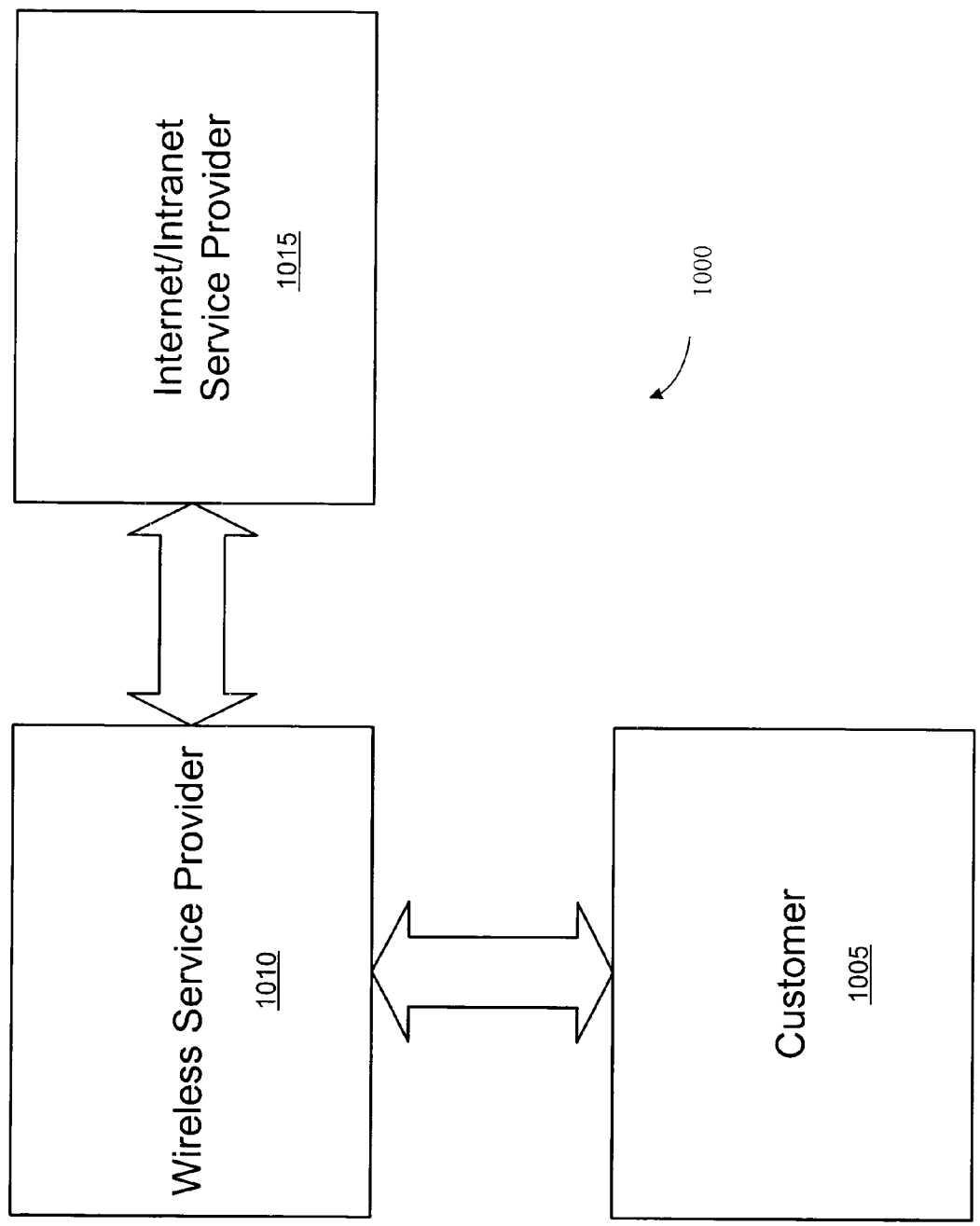
FIG. 10 is a block diagram illustrating a typical business environment for implementing the described systems.

Referring now to FIG. 10, a typical business environment 1000 for implementing business models using the described systems 100, 700, 800, or 900 ("the systems") include three principal parties: a customer, a wireless service provider, and an Internet/Intranet Service Provider (ISP) 1015.

First, an end user, patron, or customer 1005 possesses the personal data access device 112 such as laptop or portable handset 705 (FIG. 7). This personal access device has the ability to communicate with a communications device such as telephone 120 or node 705. Customer 1005 may be a patron to a restaurant, a traveler in an airport terminal, a commuter on a city street, or the temporary resident of a hotel.

Second, a wireless service provider 1010 provides the communication device, such as telephone 120 (FIG. 2) or node 902 (FIG. 9) which can wirelessly connect to the personal access device 112 through the means described in connection with the systems above. Wireless service provider 1010, for example, may be a restaurant, an airport, a pay telephone owner or operator, or a hotel. Wireless service provider 1010 supplies the hardware and the connection to the communication device, but may not necessarily provide the service to connect to the Internet or Intranet over the PSTN 118.

A third party, Internet/Intranet Service Provider (ISP) 1020 provides the service connecting the customer 1005 to the remote communications device 114. Ultimately, remote communications device 114 may provide user 1005 with access to the Internet. ISP 1020 may be a traditional dial-up ISP when personal data access device 112 connects to the network using system 200 (FIG. 5). In the alternative, ISP 1020 may provide broadband services according to system 300 (FIG. 6).

Of course, in some situations ISP 1020 and wireless service provider 1010 may be the same entity. For example, a pay telephone company may operate both pay telephones and an Internet/Intranet access service.

In one embodiment, wireless service provider 1010 may require appropriate identification from customer 1005 to access a communications device. For example, the customer 1005 may be required to enter billing and/or identifying information through a provided portal each time a user wishes to gain access to the communications device. In other situations, wireless service provider 1010 may be able to decode identifying information sent from a customer's 1005 personal data access device 112. The wireless service provider 1010 may charge for access, or simply use the access as a free service designed to attract customers. For instance, when wireless service provider 1010 is a hotel the telephones installed throughout the hotel may be freely accessed as part of a guest's included amenities. On the other hand, the hotel may charge a fixed fee for an allotted access window, or alternatively the hotel may charge a customer on the basis of actual time of access, or the amount of data transmitted.

In another embodiment, ISP 1020 controls the access of user 1005 to the Internet instead of wireless service provider 1010. In this situation wireless service provider 1010 may provide the physical means to access the remote communication unit 114, but the ISP 1020 restricts access based on well known payment or billing procedures such as those currently used by dial-up and DSL internet providers.

In yet another embodiment, wireless service provider 1010 may provide all compensation to ISP 1020 for a user's 1005 access to remote communication unit 114. In this situation, customer 1005 does not compensate other parties for access. Thus, instead of charging for access, wireless service providers may use this method to entice customers 1005 to remain within the physical proximity of a wireless service provider 1010 for a longer period of time. By retaining the customers 1005 for a longer period of time, the wireless service provider 1010 has the opportunity to sell the customer more goods or services. For example, a coffee shop wishing to entice their customers to stay for another cup of coffee may provide a freely accessed communication device, such as node 902. This enables the coffee shop's customers to surf the Internet at their leisure at no cost to the customer 1005.

While several specific business models have been discussed, one skilled in the art would recognize that many models of payment for access to the remote communication unit 114 and/or a communication device such as telephone 120 are well within the spirit and scope of the invention.

Business environment 1000 may be implemented by various industries to provide data and/or voice communications for patrons. The business model is typically more successful in any location where communication devices typically already exist and the potential for data transmissions are high.

For example, a wireless service provider 1010 may be a business providing pay-telephone service via a network of pay-type telephones. The business providing the pay-phone service may retrofit their pay-type telephones throughout a geographic area with any of the described systems. The existing base of pay-type telephones are designed to primarily handle voice-type telephone calls by using a provided handset 128 integrated with the telephone. By incorporating a controller 130, R.F. transceiver 122, and interface circuit 124 into the base of telephones throughout a geographic area, a customer 1005 is provided with a method of remotely communicating voice and/or data with a personal data access device 112 without using a cellular base station 22. While the preferred embodiment retains the function of providing the access to a pay-telephone for normal voice calls using the pay-phone's integrated handset 128, in some cases the pay-type telephone may be removed leaving only a wireless node. In this case, the interface circuit 124 continues to handle the function of providing an interface between the PSTN and controller 130 and RF transceiver 122, but the telephone circuitry 126 and handset 128 are no longer needed.

Similarly, wireless service providers 1010 may include airports, subways, bus stations, and other transportation hubs that could use the system in conjunction with the pay-type telephones 120 or other communication devices found throughout the terminals and waiting areas. By installing pay-phones 120 containing the required circuitry (for example, system 100), or by installing add-on circuitry in a separate module 121 associated with the pay-phones (for example, system 900) an airport is able to provide wireless Internet access to travelers without the inconvenience of installing new cabling throughout a terminal.

Instead of a pay-type telephone in a public area, the communication device may be a telephone 120 in a hotel room, a telephone in a conference room, or an office telephone. For example, a hotel may use the business environment 1000 as an efficient way of deploying wireless Internet throughout a hotel. By placing transceivers 122 in or near the telephones in guest rooms, lobbies, and meeting areas, the hotel is provided with a network capable of supporting wireless communications between a personal data access device 112 and a remote communication unit 114 throughout the hotel. Similarly, an office building can be completely outfitted with a data network by using an existing telephone communications infrastructure, without running additional cables throughout the building.

Restaurants and other retailers may wish to install wireless communication nodes according to the described business environment 1000 in order to attract and retain customers 1005. For example, a retailer that wishes to attract customers may provide a wireless node 902 during a customer 1005 visit. Customers may own their own RF transceiver, installed within their personal access device 112, or they may rent or borrow the transceiver from the restaurant in order to use the service during the visit. This transceiver may be integrated into a PCMCIA (Personal Computer Memory Card International Association) adapter card that fits into a corresponding slot of a laptop computer. The retailer may use the system as a way to retain patrons in the store, to provide additional advertising and information to the customers, and if the service is provided for a fee, additional revenue. Because most business locations already have a telephone connection for voice communications, the connection to the PSTN 118 typically already exists. Therefore, system 900 is easily installed and maintained.

Figure 11:
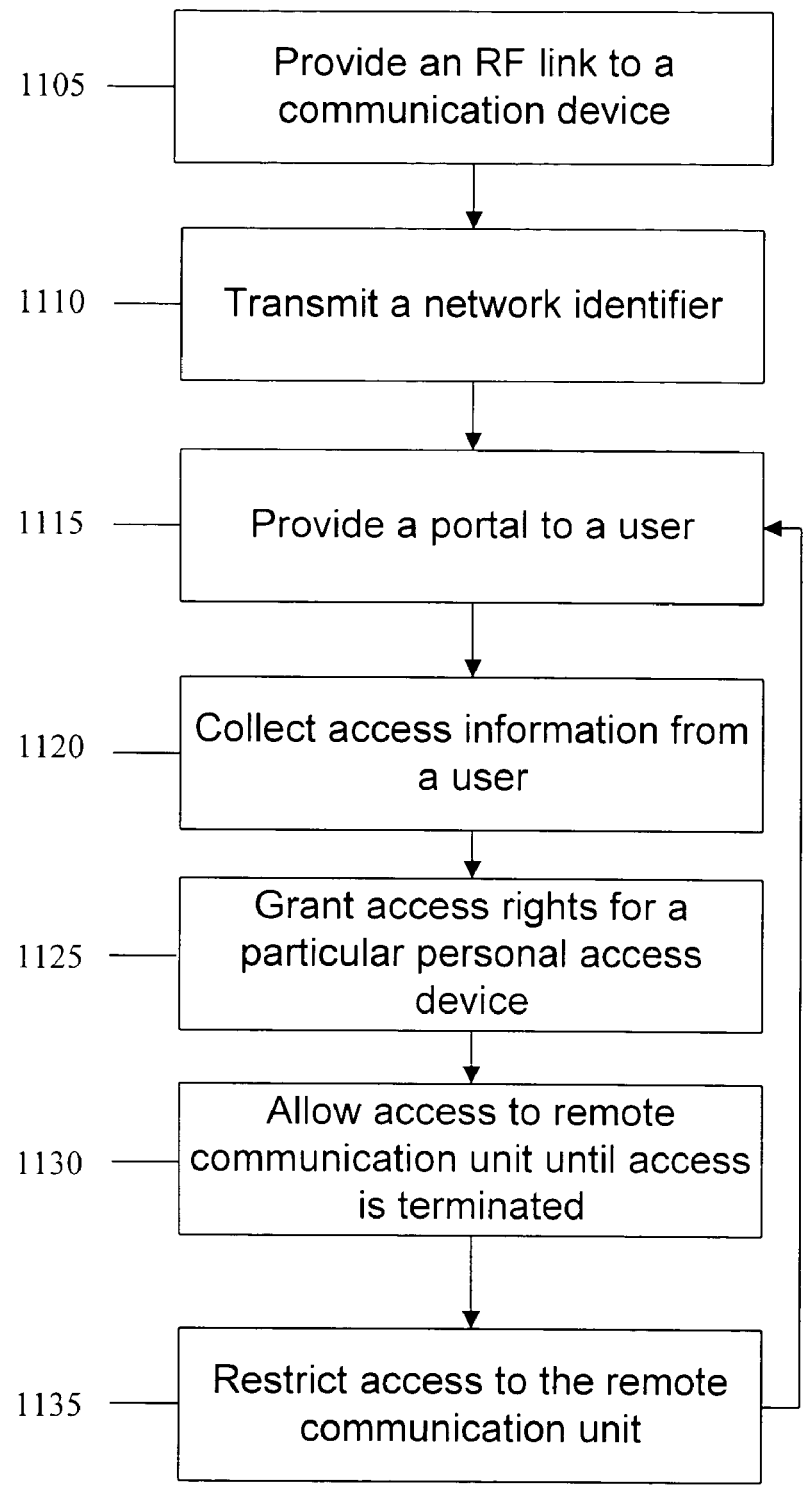
FIG. 11 is a flowchart illustrating the steps used to provide wireless data networking over a PSTN between a personal access device and a remote communications unit.

FIG. 11 shows one example of how the systems and methods of the invention may be used by a wireless service provider 1010 to provide wireless data networking between a personal data access device 112 and a remote communication unit 114. An RF link to a communications device may be provided in high traffic areas where users frequently gather (step 1105). For example, cafes, restaurants, airports, bus stations, hotels, and bus stops are examples of such places that typically have an installed base of telephones 120. Because several networks 124 (FIG. 7) may be located within the same proximity of each other, a network identifier may be transmitted by a communication device in order to identify a particular collection of communication devices making up a network (step 1110). A network is simply defined as a collection of one or more communication devices designed to be accessed under the same service provider. The network identifier may be provided in the format of an access code used to connect to the proper network. Alternatively, the user may execute software on the personal access device 112 to "sniff" for available networks.

If a list of available networks is found, the user may then select the appropriate network to join. Once the user has joined the network, a portal may be provided as an initial display to the user; typically the portal is displayed within an Internet browser in order to establish access privileges (step 1115). Initially, the portal may be the only accessible feature on the network. However, once access privileges are granted, the personal access device 112 may be granted access to some greater amount of features, such as access to the Internet, after providing requested information (step 1120). For instance, the portal may request billing information which may be in the form of a credit card number, hotel room number, subscription account number, gift card number, or other known payment methods in exchange for the additional access to the system. Alternatively, many businesses may not charge at all for the service, but may still require information used to identify the user. In either case, the business may use the portal to advertise or provide information to customers. In the case of free access, the provider may not use a portal at all. Access rights can be granted to a personal access device 112 as determined based on a restricted usage of time, a restricted data transfer quantity, or a predetermined number of accesses (step 1125). Once the personal access device 112 has acquired access to the system, the user may continue to use the additional features until the access rights expire (step 1130). When the access rights have expired, the system may restrict access to the additional features and provide the portal for purchasing additional access rights (step 1135).

While it is anticipated that many users may pay for access via the portal using an electronic registration form and a charge account, many other forms of payment are within the scope of the invention. For example, the user may purchase access to the system at the communications device itself. In particular, a pay-type telephone 120 may have a credit card reader and user interface for activating access. Alternatively, the pay-type telephone 120 may use voice activated prompts to guide a user through payment for the access to the service.

In another embodiment, a subscription service may be provided such that a user may pre-arrange access to the network. According to this embodiment, a personal access device 112 may be automatically identified based on unique identification such as an Ethernet address. Alternatively, a user may enter identifying information into the portal to identify the prearranged subscription. It is contemplated that other commonly known billing methods, such as providing registration to a user through an Internet web portal, or by calling a service provider could also be used.

The transceiver 160 and related circuitry in the personal data access device 112 may be usable with a communication device such as pay-type telephone 120 operated by many different wireless service providers 1010 such that an customer 1005 may access a plurality of communications devices without purchasing additional transceiver circuitry for each service. For example, the RF link 115 between the telephone 120 and the personal data access device 112 may be any number of commonly-used, standardized protocols known in the art. For example, systems using Bluetooth technology, or systems using the wireless-Ethernet IEEE 802.11 standards (e.g. 802.11(a), 802.11(b), and 802.11(g)), commonly known as "Wi-Fi," are contemplated. The 802.11 specification is an over-the-air interface between a wireless client and a transceiver in a base station or between two wireless clients. The 802.11 standard generally applies to wireless LANs and provides 1 or 2 Mbps transmission in the 2.4 GHz band using either frequency hopping spread spectrum (FHSS) or direct sequence spread spectrum (DSSS). The 802.11(a) variation is an extension to 802.11 that applies to wireless LANs and provides up to 54 Mbps in the 5 GHz band. The 802.11(a) variation uses an orthogonal frequency division multiplexing encoding scheme rather than FHSS or DSSS. The 802.11(b) variation, is an extension to 802.11 that applies to wireless LANs and provides an 11 Mbps transmission with a fallback to 5.5, 2 and 1 Mbps in the 2.4 GHz band. 802.11(b) uses only DSSS. The 802.11g variation applies to wireless LANs and provides over 20 Mbps in the 2.4 GHz band. Because this type of network technology provides network circuitry capable of being used with multiple wireless service providers 1010, a customer 1005 will typically own all the circuitry needed to interact with a communications device 120. However, some wireless service providers 1010 may rent the required transceiver to a user 1005 for a personal access device 112, and any rental fees may be included in the total revenue for the system.

Accordingly, as described above, a system is provided for communicating with a remote communication unit via a public switched telephone network (PSTN). In one embodiment, the system includes a personal data access device executing a program that is to communicate with the remote communication unit via the PSTN, a data communication device associated with the personal data access device and in communication with the program, and a first radio frequency (RF) transceiver associated with the personal data access device and in communication with the data communication device. The system further includes a public, pay-type telephone, electrically connected for communication over the PSTN, a second RF transceiver associated with the telephone, the second RF transceiver configured for communication, via an RF link, with the first RF transceiver, and a controller associated with the telephone, responsive to communications received from the first RF transceiver to seize a phone line, initiate, and establish a communication link over the PSTN to a remote communication link designated by the personal data access device, the controller and the program being further configured to maintain two-way communication between the personal data access device and the remote communication device via the PSTN and the RF link.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for communicating with a remote communication unit via a public switched telephone network (PSTN), comprising:

a personal data access device executing a program that is to communicate with the remote communication unit via the PSTN;

a first radio frequency (RF) transceiver associated with the personal data access device and in communication with the program, wherein the first RF transceiver is controlled by the program;

a public, pay-type telephone, electrically connected for communication over the PSTN;

a second RF transceiver interfaced with the telephone, the second RF transceiver configured for communication, via an RF link, with the first RF transceiver; and a controller interfaced with the telephone, responsive to communications received from the first RF transceiver to communicate over a data communication link via the PSTN to the remote communication unit designated by the personal data access device, the controller being configured to allow data communications over the PSTN, the controller and the program being further configured to maintain two-way communication between the personal data access device and the remote communication unit via the PSTN and the RF link, and the controller being further configured to terminate the data communication link over the PSTN to the remote communication unit designated by the personal data access device, wherein responsive to receiving from the first RF transceiver a termination communication that originated from the program, the controller terminates the data communication link.

2. The system as defined in claim 1, wherein the personal data access device is a device selected from the group consisting of: a desktop computer, a laptop computer, a hand-held computing device, a portable handset, and a palm-corder.

3. The system as defined in claim 2, wherein the portable handset digitizes an analog voice signal into data packets, and the public, pay-type telephone relays the data packets to the remote communication unit.

4. The system as defined in claim 1, further including:

a second public, pay-type telephone, electrically connected for communication over the PSTN;

a third RF transceiver interfaced with the second telephone, the third RF transceiver configured for communication, via an RF link, with the first RF transceiver; and circuitry associated with the first RF transceiver to monitor a signal link strength of a current communication with the second RF transceiver and the signal link strength of the third RF transceiver;

wherein the first RF transceiver is configured to transfer the current communication to the third RF transceiver based on the signal link strength.

5. The system as defined in claim 1, wherein the controller and second RF transceiver are interfaced to the public, pay-type telephone through an interface selected from the group consisting of: a wired and a wireless connection.

6. The system as defined in claim 1, wherein the controller and second RF transceiver are located outside the pay-phone in a separate module.

7. The system as defined in claim 1, wherein the public, pay-type telephone includes a digital subscriber line (DSL) modem for communicating data between the PSTN and the second RF transceiver.

8. The system as defined in claim 1, wherein the controller is further configured to allow simultaneous voice and data communication over the PSTN.

9. A system for communicating with a remote communication unit via a public switched telephone network (PSTN), comprising:

a personal data access device having a first radio frequency (RF) transceiver;

a communication device for communication over the PSTN;

a second RF transceiver interfaced with the communication device, the second RF transceiver configured for communication with the first RF transceiver via an RF link; and a controller associated with the communication device, responsive to communications received from the first RF transceiver to communicate over a phone line via the PSTN and maintain two-way communication between the personal data access device and the remote communication unit via the PSTN and the RF link, the controller being configured to allow data communications over the PSTN and being configured to terminate the communication between the personal data access device and the remote communication unit, wherein responsive to receiving from the first RF transceiver a termination message, the controller terminates the communication between the personal data access device and the remote communication unit.

10. The system of claim 9, wherein the remote communication unit provides access to a network, wherein the network is selected from the group consisting of: a wide area network (WAN), a local area network (LAN), an Intranet, and the Internet.

11. The system of claim 9, wherein the first and second RF transceiver communicate over the RF link using a protocol selected from the group consisting of: single channel frequency hopping, multi-channel frequency hopping, and direct sequence spread spectrum.

12. The system of claim 9, wherein the controller and second RF transceiver are located outside of the communications device in a separate module.

13. The system of claim 9, further including a second personal data access device having a fourth radio frequency (RF) transceiver;

wherein the second RF transceiver interfaced with the communication device is configured to maintain communications with the second RF transceiver and the fourth RF transceiver simultaneously.

14. The system of claim 9, wherein the first radio frequency (RF) transceiver is integrated into a Personal Computer Memory Card International Association (PCMCIA) card.

15. The system of claim 9, wherein the communications device is located inside a stationary device, wherein the stationary device selected from the group consisting of: an electric sign or a billboard.

16. The system as defined in claim 9, wherein the personal data access device is a portable handset configured to transmit digitized voice signals between to the first RF transceiver and the second RF transceiver.

17. The system as defined in claim 9, wherein the communications device includes a digital subscriber line (DSL) modem for communicating data between the PSTN and the second RF transceiver.

18. The system as defined in claim 9, wherein the controller is further configured to allow simultaneous voice and data communication over the PSTN.

19. A system for communicating with a remote communication unit via a public switched telephone network (PSTN), comprising:

a personal data access device executing a program that is to communicate with the remote communication unit via the PSTN;

a first radio frequency (RF) transceiver associated with the personal data access device and in communication with the program, wherein the first RF transceiver is controlled by the program;

a communications device electrically connected for communication over the PSTN;

a second RF transceiver interfaced with the communications device, the second RF transceiver configured for communication, via an RF link, with the first RF transceiver; and a controller interfaced with the communications device, responsive to communications received from the first RF transceiver to communicate over a data communication link via the PSTN to the remote communication unit designated by the personal data access device, the controller being configured to allow data communications over the PSTN, the controller and the program being further configured to maintain two-way communication between the personal data access device and the remote communication unit via the PSTN and the RF link, and the controller being further configured to terminate the data communication link over the PSTN to the remote communication unit designated by the personal data access device, wherein responsive to receiving from the first RF transceiver a termination communication that originated from the program, the controller terminates the data communication link.

20. The system as defined in claim 19, wherein the communications device is a device selected from the group consisting of: a node, a public pay-type telephone, a telephone, and a DSL modem.

21. The system as defined in claim 19, wherein the controller is further configured to allow simultaneous voice and data communication over the PSTN.

* * * * *